(12) United States Patent
Farmer et al.

(10) Patent No.: US 7,877,014 B2
(45) Date of Patent: Jan. 25, 2011

(54) METHOD AND SYSTEM FOR PROVIDING A RETURN PATH FOR SIGNALS GENERATED BY LEGACY VIDEO SERVICE TERMINALS IN AN OPTICAL NETWORK

(75) Inventors: James O. Farmer, Cumming, GA (US); Stephen A. Thomas, Marietta, GA (US); Patrick W. Quinn, Lafayette, CA (US); Deven J. Anthony, Tampa, FL (US)

(73) Assignee: Enablence Technologies Inc., Alpharetta, GA (US)

( * ) Notice: Subject to any disclaimer, the term of this patent is extended or adjusted under 35 U.S.C. 154(b) by 1049 days.

(21) Appl. No.: 11/005,488

(22) Filed: Dec. 6, 2004

(65) Prior Publication Data

US 2005/0125837 A1 Jun. 9, 2005

Related U.S. Application Data

(63) Continuation-in-part of application No. 09/899,410, filed on Jul. 5, 2001, now Pat. No. 6,973,271.

(60) Provisional application No. 60/527,867, filed on Dec. 5, 2003.

(51) Int. Cl.
*H04B 10/00* (2006.01)
(52) U.S. Cl. .............................. 398/72; 398/66; 398/71
(58) Field of Classification Search .............. 398/66–72
See application file for complete search history.

(56) References Cited

U.S. PATENT DOCUMENTS

| 4,253,035 A | 2/1981 | Amitay |
| 4,295,005 A | 10/1981 | Daugherty et al. |
| 4,495,545 A | 1/1985 | Dufresne et al. |
| 4,500,990 A | 2/1985 | Akashi |
| 4,654,891 A | 3/1987 | Smith |
| 4,655,517 A | 4/1987 | Bryce |
| 4,665,517 A | 5/1987 | Widmer |
| 4,733,398 A | 3/1988 | Shibagaki et al. |
| 4,763,317 A | 8/1988 | Lehman et al. |

(Continued)

FOREIGN PATENT DOCUMENTS

CA 2107922 4/1995

(Continued)

OTHER PUBLICATIONS

PCT International Search Report—PCT/US01/50361.

(Continued)

*Primary Examiner*—Agustin Bello
(74) *Attorney, Agent, or Firm*—Sentry Law Group; Steven P. Wigmore

(57) ABSTRACT

A return path system includes inserting RF packets between regular upstream data packets, where the data packets are generated by communication devices such as a computer or internet telephone. The RF packets can be derived from analog RF signals that are produced by legacy video service terminals. At a data service hub, a digitized-RF-to-packet converter (DRPC) can convert the RF packets into standard sized packets such as Ethernet packets for processing by a video services controller. In this way, the present invention can provide an RF return path for legacy terminals that shares a return path for regular data packets in an optical network architecture.

20 Claims, 15 Drawing Sheets

U.S. PATENT DOCUMENTS

| | | |
|---|---|---|
| 4,805,979 A | 2/1989 | Bossard et al. |
| 4,852,023 A | 7/1989 | Lee et al. |
| 4,945,541 A | 7/1990 | Nakayama |
| 4,956,863 A | 9/1990 | Goss |
| 4,975,899 A | 12/1990 | Faulkner |
| 5,105,336 A | 4/1992 | Jacoby et al. |
| 5,132,992 A | 7/1992 | Yurt et al. |
| 5,144,267 A | 9/1992 | West, Jr. |
| 5,179,591 A | 1/1993 | Hardy |
| 5,189,725 A | 2/1993 | Bensell, III et al. |
| 5,247,347 A | 9/1993 | Litteral et al. |
| 5,249,194 A | 9/1993 | Sakanushi |
| 5,253,250 A | 10/1993 | Schlafer et al. |
| 5,253,275 A | 10/1993 | Yurt et al. |
| 5,303,295 A | 4/1994 | West et al. |
| 5,313,546 A | 5/1994 | Toffetti |
| 5,325,223 A | 6/1994 | Bears |
| 5,345,504 A | 9/1994 | West, Jr. |
| 5,349,457 A | 9/1994 | Bears |
| 5,361,091 A * | 11/1994 | Hoarty et al. ............... 725/119 |
| 5,365,585 A | 11/1994 | Puhl et al. |
| 5,365,588 A | 11/1994 | Bianco et al. |
| 5,378,174 A | 1/1995 | Brownlie et al. |
| 5,402,315 A | 3/1995 | Reichle |
| 5,412,498 A | 5/1995 | Arstein et al. |
| 5,432,875 A | 7/1995 | Korkowski et al. |
| 5,469,507 A | 11/1995 | Canetti et al. |
| 5,495,549 A | 2/1996 | Schneider et al. |
| 5,509,099 A | 4/1996 | Hermsen et al. |
| 5,510,921 A | 4/1996 | Takai et al. |
| 5,528,455 A | 6/1996 | Miles |
| 5,528,582 A | 6/1996 | Bodeep |
| 5,534,912 A | 7/1996 | Kostreski |
| 5,541,917 A | 7/1996 | Farris |
| 5,550,863 A | 8/1996 | Yurt et al. |
| 5,557,317 A | 9/1996 | Nishio et al. |
| 5,559,858 A | 9/1996 | Beveridge |
| 5,566,099 A | 10/1996 | Shimada |
| 5,572,347 A | 11/1996 | Burton et al. |
| 5,572,348 A | 11/1996 | Carlson et al. |
| 5,572,349 A | 11/1996 | Hale |
| 5,666,487 A | 9/1997 | Goodman et al. |
| 5,694,232 A | 12/1997 | Parsay et al. |
| 5,701,186 A | 12/1997 | Huber |
| 5,706,303 A | 1/1998 | Lawrence |
| 5,715,020 A | 2/1998 | Kuroiwa et al. |
| 5,731,546 A | 3/1998 | Miles et al. |
| RE35,774 E | 4/1998 | Moura et al. |
| 5,758,256 A * | 5/1998 | Berry et al. ................... 455/72 |
| 5,769,159 A | 6/1998 | Yun |
| 5,778,017 A | 7/1998 | Sato et al. |
| 5,790,523 A | 8/1998 | Ritchie, Jr. |
| 5,793,413 A | 8/1998 | Hylton |
| 5,793,506 A | 8/1998 | Schmid |
| 5,799,088 A | 8/1998 | Raike |
| 5,802,089 A | 9/1998 | Link |
| 5,822,102 A | 10/1998 | Bodeep et al. |
| 5,861,966 A | 1/1999 | Ortel |
| 5,867,485 A | 2/1999 | Chambers et al. |
| 5,875,430 A | 2/1999 | Koether |
| 5,880,864 A | 3/1999 | Williams |
| 5,892,865 A | 4/1999 | Williams |
| 5,953,690 A | 9/1999 | Lemon |
| 5,969,836 A | 10/1999 | Foltzer |
| 5,974,063 A | 10/1999 | Yoshida |
| 6,002,692 A | 12/1999 | Wills |
| 6,002,720 A | 12/1999 | Yurt et al. |
| 6,041,056 A | 3/2000 | Bigham et al. |
| 6,097,159 A | 8/2000 | Mogi |
| 6,097,515 A | 8/2000 | Pomp et al. |
| 6,144,702 A | 11/2000 | Yurt et al. |
| 6,151,343 A | 11/2000 | Jurgensen |
| 6,167,553 A | 12/2000 | Dent |
| RE37,125 E | 4/2001 | Carlson |
| 6,215,939 B1 | 4/2001 | Cloud |
| 6,229,701 B1 | 5/2001 | Kung et al. |
| 6,295,148 B1 | 9/2001 | Atlas |
| 6,300,562 B1 | 10/2001 | Daoud |
| 6,330,155 B1 | 12/2001 | Remsburg |
| 6,336,201 B1 | 1/2002 | Geile et al. |
| 6,342,004 B1 | 1/2002 | Lattimore et al. |
| 6,356,369 B1 | 3/2002 | Farhan |
| 6,360,320 B1 | 3/2002 | Ishiguro et al. |
| 6,385,366 B1 | 5/2002 | Lin |
| 6,421,150 B2 | 7/2002 | Graves |
| 6,424,656 B1 | 7/2002 | Hoebeke |
| 6,427,035 B1 | 7/2002 | Mahony |
| 6,452,714 B1 | 9/2002 | Rollins |
| 6,460,182 B1 | 10/2002 | BuAbbud |
| 6,463,068 B1 | 10/2002 | Lin et al. |
| 6,483,635 B1 | 11/2002 | Wach |
| 6,486,907 B1 | 11/2002 | Farber et al. |
| 6,490,727 B1 | 12/2002 | Nazarathy et al. |
| 6,493,335 B1 | 12/2002 | Darcie et al. |
| 6,496,641 B1 | 12/2002 | Mahony |
| 6,507,494 B1 | 1/2003 | Hutchison |
| 6,529,301 B1 | 3/2003 | Wang |
| 6,546,014 B1 | 4/2003 | Kramer et al. |
| 6,577,414 B1 | 6/2003 | Feldman et al. |
| 6,611,522 B1 | 8/2003 | Zheng et al. |
| 6,621,975 B2 | 9/2003 | Laporte et al. |
| 6,654,565 B2 | 11/2003 | Kenny |
| 6,674,967 B2 | 1/2004 | Skrobko et al. |
| 6,680,948 B1 | 1/2004 | Majd et al. |
| 6,682,010 B2 | 1/2004 | Pohl |
| 6,687,376 B1 | 2/2004 | Yamaguchi |
| 6,687,432 B2 | 2/2004 | Schemmann et al. |
| 6,707,024 B2 | 3/2004 | Miyamoto |
| 6,738,983 B1 | 5/2004 | Rao et al. |
| 6,740,861 B2 | 5/2004 | Matsuda |
| 6,771,614 B1 | 8/2004 | Jones, IV et al. |
| 6,775,137 B2 | 8/2004 | Chu et al. |
| 6,778,785 B2 | 8/2004 | Imajo |
| 6,804,256 B2 | 10/2004 | Chang |
| 6,804,354 B1 | 10/2004 | Driscoll |
| 6,807,188 B1 | 10/2004 | Blahut et al. |
| 6,814,328 B1 | 11/2004 | Li et al. |
| 6,823,385 B2 | 11/2004 | McKinnon, III et al. |
| 6,889,007 B1 | 5/2005 | Wang et al. |
| 6,889,385 B1 * | 5/2005 | Rakib et al. ................. 725/119 |
| 6,912,075 B1 | 6/2005 | Ionov et al. |
| 6,961,956 B2 | 11/2005 | Bontempi |
| 6,973,271 B2 | 12/2005 | Farmer et al. |
| 7,007,297 B1 | 2/2006 | Woodward |
| 7,023,871 B2 | 4/2006 | Lind et al. |
| 7,149,223 B2 * | 12/2006 | Liva et al. ................... 370/401 |
| 7,155,128 B2 | 12/2006 | Roberts et al. |
| 7,190,901 B2 | 3/2007 | Farmer et al. |
| 7,194,001 B2 * | 3/2007 | Leatherbury et al. ... 370/395.64 |
| 7,218,855 B2 | 5/2007 | Whittlesey et al. |
| 7,222,358 B2 | 5/2007 | Levinson et al. |
| 7,227,871 B2 | 6/2007 | Dworkin et al. |
| 7,242,694 B2 | 7/2007 | Beser |
| 7,269,355 B2 | 9/2007 | Naoe et al. |
| 7,343,614 B1 * | 3/2008 | Hendricks et al. ............... 725/8 |
| 7,392,279 B1 * | 6/2008 | Chandran et al. ........... 709/200 |
| 2001/0002195 A1 | 5/2001 | Fellman |
| 2001/0002196 A1 | 5/2001 | Fellman |
| 2001/0002486 A1 | 5/2001 | Kocher et al. |
| 2001/0004362 A1 | 6/2001 | Kamiya |
| 2001/0030785 A1 | 10/2001 | Pangrac |
| 2002/0006197 A1 | 1/2002 | Carroll et al. |
| 2002/0012138 A1 | 1/2002 | Graves |
| 2002/0021465 A1 | 2/2002 | Moore, Jr. |

| | | | |
|---|---|---|---|
| 2002/0027928 A1 | 3/2002 | Fang | |
| 2002/0039218 A1 | 4/2002 | Farmer | |
| 2002/0063924 A1 | 5/2002 | Kimbrough et al. | |
| 2002/0063932 A1 | 5/2002 | Unitt et al. | |
| 2002/0080444 A1 | 6/2002 | Phillips et al. | |
| 2002/0089725 A1 | 7/2002 | Farmer | |
| 2002/0105965 A1 | 8/2002 | Dravida et al. | |
| 2002/0106178 A1 | 8/2002 | Bumgarner et al. | |
| 2002/0116719 A1 | 8/2002 | Dapper et al. | |
| 2002/0135843 A1 | 9/2002 | Gruia | |
| 2002/0141159 A1 | 10/2002 | Bloemen | |
| 2002/0164026 A1 | 11/2002 | Huima | |
| 2002/0181925 A1 | 12/2002 | Hodge et al. | |
| 2003/0007210 A1 | 1/2003 | Kenny | |
| 2003/0007220 A1 | 1/2003 | Whittlesey et al. | |
| 2003/0011849 A1 | 1/2003 | Farmer et al. | |
| 2003/0016692 A1 | 1/2003 | Thomas et al. | |
| 2003/0046707 A1* | 3/2003 | Shalvi et al. | 725/111 |
| 2003/0048512 A1 | 3/2003 | Ota | |
| 2003/0072059 A1 | 4/2003 | Thomas et al. | |
| 2003/0081619 A1* | 5/2003 | Phillips et al. | 370/400 |
| 2003/0086140 A1 | 5/2003 | Thomas et al. | |
| 2003/0090320 A1 | 5/2003 | Skrobko et al. | |
| 2003/0128983 A1 | 7/2003 | BuAbbud et al. | |
| 2003/0154282 A1 | 8/2003 | Horvitz | |
| 2003/0189587 A1 | 10/2003 | White et al. | |
| 2003/0194241 A1 | 10/2003 | Farmer | |
| 2003/0206564 A1 | 11/2003 | Mills et al. | |
| 2003/0206634 A1 | 11/2003 | Rose | |
| 2003/0223750 A1 | 12/2003 | Farmer et al. | |
| 2004/0028405 A1 | 2/2004 | Unitt et al. | |
| 2004/0086277 A1 | 5/2004 | Kenny | |
| 2004/0131357 A1 | 7/2004 | Farmer et al. | |
| 2004/0141747 A1 | 7/2004 | Kenny et al. | |
| 2004/0161217 A1 | 8/2004 | Hodge et al. | |
| 2004/0172658 A1* | 9/2004 | Rakib et al. | 725/120 |
| 2004/0199502 A1 | 10/2004 | Wong et al. | |
| 2004/0221088 A1 | 11/2004 | Lisitsa et al. | |
| 2004/0253003 A1 | 12/2004 | Farmer et al. | |
| 2004/0264492 A1 | 12/2004 | Blahut | |
| 2004/0267730 A1 | 12/2004 | Dumais et al. | |
| 2005/0053350 A1 | 3/2005 | Hodge et al. | |
| 2005/0074241 A1 | 4/2005 | Farmer et al. | |
| 2005/0081244 A1 | 4/2005 | Barrett et al. | |
| 2005/0123001 A1 | 6/2005 | Craven et al. | |
| 2005/0125837 A1 | 6/2005 | Farmer et al. | |
| 2005/0175035 A1 | 8/2005 | Neely et al. | |
| 2006/0020975 A1 | 1/2006 | Kenny et al. | |
| 2006/0039699 A1 | 2/2006 | Farmer et al. | |
| 2006/0075428 A1 | 4/2006 | Farmer et al. | |
| 2007/0050835 A1* | 3/2007 | Liva et al. | 725/129 |
| 2007/0076717 A1 | 4/2007 | Limb et al. | |
| 2007/0288977 A1* | 12/2007 | Shalvi et al. | 725/111 |

FOREIGN PATENT DOCUMENTS

| | | |
|---|---|---|
| EP | 0566662 B1 | 7/1992 |
| EP | 0713347 A2 | 5/1996 |
| EP | 0720322 A2 | 7/1996 |
| EP | 0955739 A2 | 11/1999 |
| EP | 0933892 B1 | 10/2003 |
| JP | 07-020327 | 1/1995 |
| JP | 10-020123 | 1/1998 |
| JP | 11-305052 | 11/1999 |
| JP | 4-504433 | 3/2002 |
| MX | 180038 | 11/1995 |
| TW | 72821 | 11/1973 |
| WO | WO 01/27940 A2 | 4/2001 |
| WO | WO 02/30019 A3 | 4/2002 |
| WO | WO 02/30020 A2 | 4/2002 |
| WO | WO 02/060123 A2 | 8/2002 |
| WO | WO 03/001737 A3 | 1/2003 |
| WO | WO 03/005611 A2 | 1/2003 |
| WO | WO 03/005612 A1 | 1/2003 |
| WO | WO 03/019243 A2 | 3/2003 |
| WO | WO 03/021820 A1 | 3/2003 |
| WO | WO 03/023980 A2 | 3/2003 |
| WO | WO 03/079567 A1 | 9/2003 |
| WO | WO 03/090396 A2 | 10/2003 |
| WO | WO 2006/014433 A2 | 2/2006 |
| WO | WO 2006/020538 A2 | 2/2006 |
| WO | WO 2006/041784 A2 | 4/2006 |

OTHER PUBLICATIONS

Fludger et al., "Pump to Signal RIN Transfer in Raman Fiber Amplifiers", Journal of Lightwave Technology, IEEE, New York, US, vol. 19, No. 8, Dec. Aug. 2001, pp. 1140-1148, ISSN: 0733-8724.

"Spectral Grids for WDM Applications: CWDM Wavelength Grid", International Telecommunication Union, ITU-T, Rec. G.694.2, Dec. 2003, pp. i-iii and pp. 1-4.

Tian et al., "Raman Crosstalk in Fiber-Optic Hybrid CATV Systems with Wide Channel Separations," IEEE Phtonics Tech Letters, Jan. 2004, pp. 344-346, vol. 16.

International Search Report dated Apr. 18, 2006 for PCT/US05/23847.

International Search Report dated Oct. 25, 2006 for PCT/US05/35512.

International Search Report dated Nov. 8, 2006 for PCT/US05/28020.

International Search Report dated Feb. 14, 2006 for PCT/US05/46419.

International Search Report dated Feb. 26, 2007 for PCT/US06/11159.

Ciciora, Walter S. et al., "Modern Cable Television Technology: Video, Voice, and Data Communications", © 1999, pp. 162-214, Chapter 4, Morgan Kaufmann Publishers, Inc., San Francisco, California.

McDevitt, F.R., Switched vs. Broadcast Video for Fiber-to-the-Home Systems, Communications 1990. ICC 90, Including Supercom Technical Sessions. SUPERCOMM/ICC '90. Conference Record, IEEE International Conference on, Apr. 16-19, 1990.

Mangum, K.: Ko, D. Subscriber Loops and Services, 1988. Proceedings, ISSLS 88., International Symposium on, Sep. 11-16, 1988 pp. 208-212.

Han et al., Burst-Mode Penalty of AC—Coupled Optical Receivers Optimized for 8B/10B Line Code, 2004, IEEE.

Coppinger et al., Nonlinear Raman Cross-Talk in a Video Overlay Passive Optical Network, 2003, Tuesday Afternoon, OFC 2003, vol. 1, pp. 285-286.

Piehler et al., Nonlinear Raman Crosstalk in a 125-Mb/s CWDM Overlay on a 1310-nm Video Access Network, 2003, Optical Society of America.

International Search Report of Apr. 18, 2006 for PCT/US05/23847.

"Trading Update and Operational Review Presentation" Marconi, Sep. 4, 2001, pp. 1-35.

"Cable Market" 2 pgs, Marconi Corporation, PLC, 2000 at www.Marconi.com.

"Communications" 2 pgs, Marconi Corporation, PLC, 2000 at www.Marconi.com.

"Dalton Utilities" 9 pgs, Marconi Corporation, PLC, 2002 at www.Marconi.com.

"Deep Fiber Solutions" 3 pgs, Marconi Corporation, PLC, 2000 at www.Marconi.com.

"Deep Fiber HFC Features and Benefits" 1 pg, Marconi Corporation, PLC, 2002 at www.Marconi.com.

"Deep Fiber HFC Network Diagram" 1 pg, Marconi Corporation, PLC, 2002 at www.Marconi.com.

"Deep Fiber HFC Product Overview: New FITL Configuration" 2 pgs, Marconi Corporation, PLC, 2002 at www.Marconi.com.

"Deep Fiber HFC Technical Specifications" 2 pgs, Marconi Corporation, PLC, 2002 at www.Marconi.com.

"Deep Fiber HFC—New FITL Configuration" 1 pg, Marconi.Corporation, PLC, 2002 at www.Marconi.com.

"En-Touch" at 5 pgs, Marconi Corporation, PLC, 2002 www.Marconi.com.

"Deep Fiber HFC" Marconi Corporation PLC 2000, pp. 1-2.

"Integrated Voice, Video and Data Services Over a Single Fiber: A Compelling Opportunity for Cable Operators" Marconi Corporation PLC, May 2000, 6 pgs.

"Deep Fiber Solutions: Advanced Broadband Services" Marconi Corporation PLC, May 2000, 5pgs.

"Deep Fiber HFC: A Next-Generation Integrated Access Solution Offering Significant Improvement Over Traditional HFC Architectures" Marconi Corporation PLC, May 2000, 8pgs.

"A Gold Mine of Opportunities in the Face of Increasing Competition: Choices for Utilities Entering the Communications Marketplace" Marconi Corporation PLC, May 2000, 6pgs.

"Fiber Optics on New Development MDUs: A Research Summary," Marconi Corporation PLC, May 2000 5pgs.

"Thermal Management Challenges: Small ONU Enclosures," Marconi Corporation PLC, May 2000, 9pgs.

"Passive Optical Networks—Is There Light at the End of the Access Tunnel?" CIBC World Markets Inc., Jan. 11, 2001, pp. 1-66.

"36.2.4 8B/10B transmission code", IEEE 2000, pp. 966-969.

G. Khoe et al., "Coherent Multicarrier Technology for Implementation in the Customer Access," IEEE, May/Jun. 1993, pp. 695-713.

L. Linnell, "A Wide-Band Local Access System Using Emerging-Technology Components," IEEE, Jul. 1986, pp. 612-618.

"Digital Broadband Delivery System: Out of Band Transport—Mode B," Society of Cable Telecommunications Engineers, Inc., Aug. 10, 1998, 76 pgs.

"Digital Broadband Delivery System: Out of Band Transport—Mode A," Society of Cable Telecommunications Engineers, Inc., Aug. 26, 1998, 49 pgs.

B. Gaglianello & P. Thompson, "An Efficient MAC Layer Protocol for EPON," IEEE 802.3 EFM Nov. 2001, 9 pgs.

Cisco IOS™ Software Quality of Service Solutions, Cisco Systems, Inc. 1998, 28 pgs.

International Search Report for PCT/US01/21298, 2 pgs, mailed Jun. 17, 2002.

International Search Report for PCT/US02/03056, 1 pg, mailed Jun. 12, 2002.

"Ethernet—Accelerating the Standard for Speed," 7 pgs, Gigabit Ethernet Alliance, Nov. 2000 www.gigabit-ethemet.org.

"eLuminant—Asynchronous Transfer Mode (ATM) Passive Optical Networks (PONS) Tutorial" 28 pgs, International Engineering Consortium, 2000 at www.iec.org.

International Search Report dated Dec. 4, 2002 for PCT/US02/27398.

International Search Report dated Dec. 17, 2002 for PCT/US02/15861.

Global Access ™, Universal Services Gateway, USG100, ARRIS, pp. 1-2, Oct. 18, 2002.

Global Access ™, Universal Access Switch, UA4024, ARRIS, pp. 1-2, Aug. 28, 2002.

Partial International Search Report dated Jan. 3, 2003 for PCT/US01/31032.

International Search Report dated Apr. 22, 2003 for PCT/US01/50361.

L. Zhang et al., "Label-switching architecture for IP traffic over WDM networks", IEE Proc.-Commun., vol. 147, No. 5, Oct. 2000, pp. 269-275.

J. Masip-Torné, et al., "Providing Differentiated Service Categories in Optical Packet Networks", Proceedings of the International Teletraffic Congress, 1999. ITC-16. Teletraffic Engineering in a Competitive World. Edinburgh, UK, Jun. 7-11, 1999, Teletraffic Science and Engineering, Amsterdam: Elsevier, NL, vol. 3B, Jun. 7, 1999, pp. 1115-1126.

J. Bannister et al., "How Many Wavelengths Do We Really Need? A Study of the Performance Limits of Packet Over WaveLengths", Optical Networks Magazin, SPIE, Bellingham, WA, vol. 1, No. 2, Apr. 2000, pp. 17-28.

O. W.W. Yang, et al., "All-Optical WDM/TDM Star-Bus Network Using Optical Amplifiers", Journal of Optical Communications, Fachverlage Schiele & Schon, Berlin, DE, vol. 16, No. 6, Dec. 1, 1995, pp. 216-226.

Walter Ciciora et al., "Modern Cable Television Technology: Video, Voice, and Data Communications", © 1999 by Morgan Kaufman Publishers, Inc., pp. 167-176.

International Search Report dated Apr. 21, 2003 for PCT/US02/28734.

Written Opinion dated May 6, 2003 for PCT/US01/21298.

International Search Report dated Jul. 2, 2003 for PCT/US03/07814.

Angelopoulos J.D. et al, "A Transparent Mac Method for Bandwidth Sharing and CDV Control at the ATM Layer of Passive Optical Networks", Journal of Lightwave Technology, IEEE. New York, US, vol. 14, No. 12, Dec. 1, 1996, pp. 2625-2634, XP000642251, ISSN: 0733-8724.

Optical Networks Daily, A Publication of Optical Keyhole, Aug. 26, 2003, pp. 1-13.

International Search Report dated Jul. 7, 2003 for PCT/US01/51350.

International Search Report dated Oct. 3, 2003 for PCT/US03/12231.

G. Scott Glasesemann et al., "The Mechanical Reliability of Corning® Optical Fiber in Bending White Paper," Sep. 2002, pp. 1-4.

Corning® SMF-™ Optical Fiber Product Information, Corning® Single-Mode Optical Fiber, Apr. 2002, pp. 1-4.

Bourne, John "Heathrow—Experience and Evolution" IEEE. 1990, pp. 1091-1095.

Miki, Tetsuya. "A Design Concept on Fiber-Optic Wavelength-Division-Multiplexing Subscriber Loop System" WTG—Fachber. 1980, pp. 41-45.

Yamaguchi, K. "A Broadband Access Network Based on Optical Signal Processing: The Photonic Highway" IEEE. 1990, pp. 1030-1037.

CEDaily Direct News, "Today's Report", Mar. 19, 2001, pp. 1-5.

Lucent Technologies, "Lucent Technologies Introduces Single-Fiber Network Access Devices for Voice, Video, and Data Services to the Home or Curb", Jun. 6, 2000, pp. 1-2.

Lucent Technologies, "Agere Systems Introduces Single-Fiber Network Access Devices for Voice, Video and Data Services to the Home or Curb", Mar. 19, 2001, pp. 1-3.

Written Opinion dated Feb. 11, 2004 for PCT/US01/50361.

Wong et al., 50-dB Nonlinear Crosstalk Suppression in a WDM Analog Fiber System by Complementary Modulation and Balanced Detection, 2003, IEEE, pp. 500-505.

Perkins, The Art of Overlaying Video Services on a BPON, 2004, Bechtel Corporation, pp. 1-9.

Effenberger et al., "G.983.VideoReturnPath," Oct. 2004, International Telecommunication Union, Telecommunication Standardization Sector, Study Group 15—Contribution 13, pp. 1-18.

International Preliminary Examination Report of Nov. 19, 2003 for PCT/US03/07814.

International Preliminary Report on Patentability of Apr. 1, 2005 for PCT/US01/51350.

International Preliminary Examination Report of Sep. 17, 2004 for PCT/US03/12231.

* cited by examiner

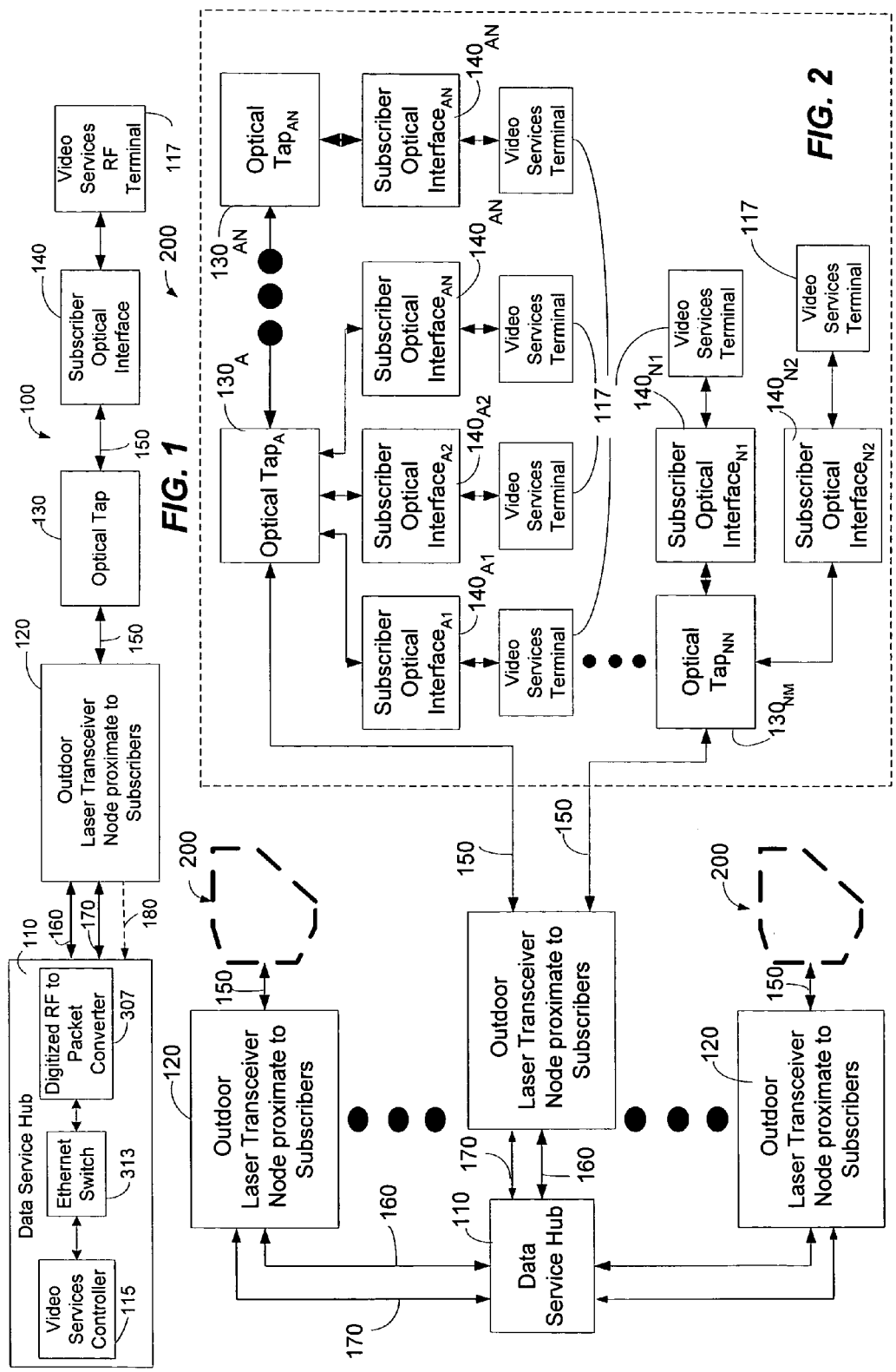

Subscriber Optical Interface 140A

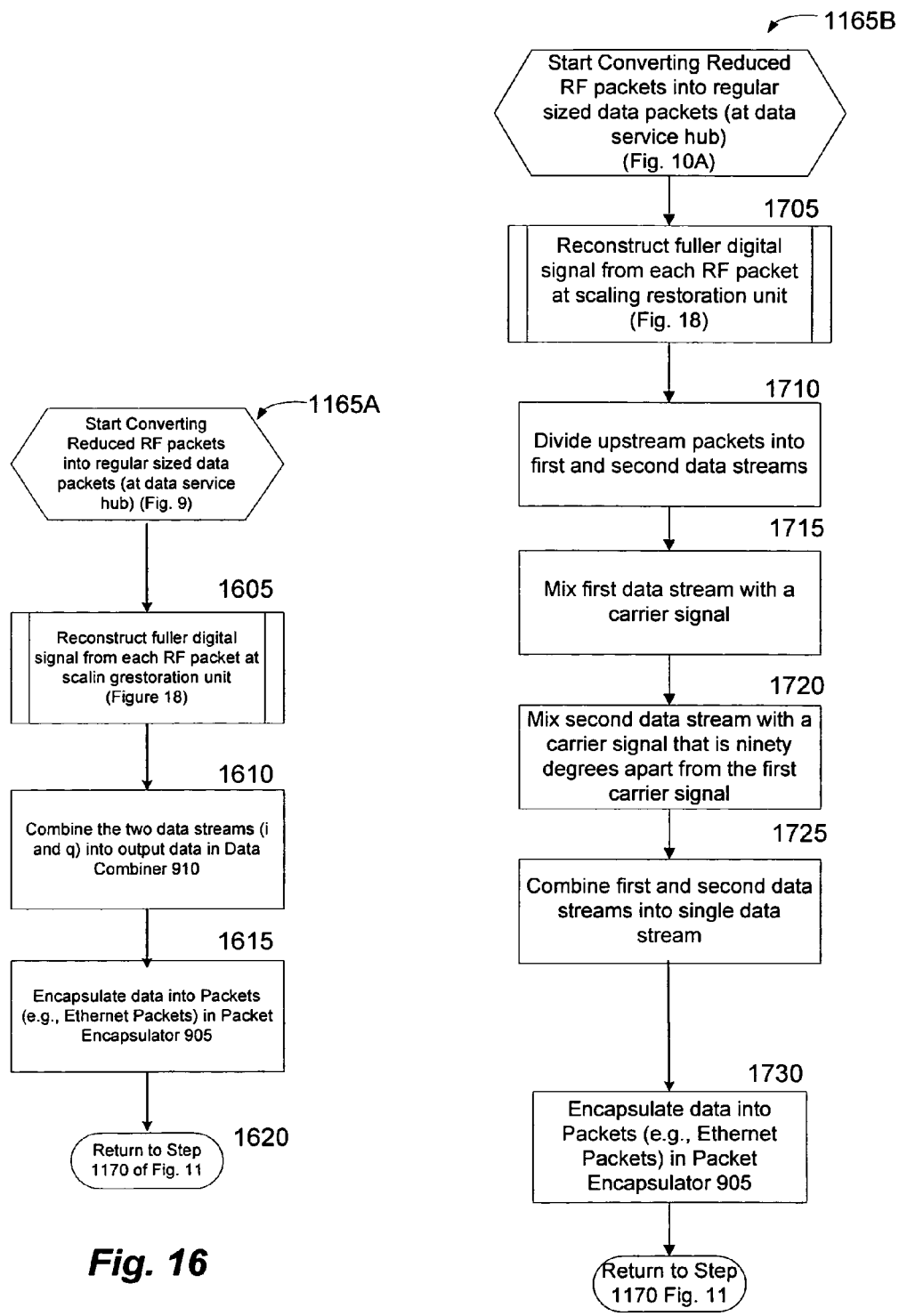

METHOD AND SYSTEM FOR PROVIDING A RETURN PATH FOR SIGNALS GENERATED BY LEGACY VIDEO SERVICE TERMINALS IN AN OPTICAL NETWORK

STATEMENT REGARDING RELATED APPLICATIONS

The present application is a continuation-in-part of non-provisional patent application entitled, "System and Method for Communicating Optical Signals Between A Data Service Provider and Subscribers," filed on Jul. 5, 2001 and assigned U.S. application Ser. No. 09/899,410 now U.S. Pat. No. 6,973,271; and the present application claims priority to provisional patent application entitled, "METHOD AND SYSTEM FOR PROVIDING A RETURN PATH FOR SIGNALS GENERATED BY LEGACY TERMINALS IN AN OPTICAL NETWORK-3," filed on Dec. 5, 2003 and assigned U.S. Application Ser. No. 60/527,867.

TECHNICAL FIELD

The present invention relates to video, voice, and data communications. More particularly, the present invention relates to a fiber-to-the-home (FTTH) system that is capable of propagating RF terminal signals from a subscriber to a data service provider.

BACKGROUND OF THE INVENTION

The increasing reliance on communication networks to transmit more complex data, such as voice and video traffic, is causing a very high demand for bandwidth. To resolve this demand for bandwidth, communications networks are relying upon optical fiber to transmit this complex data. Conventional communication architectures that employ coaxial cables are slowly being replaced with communication networks that comprise only fiber optic cables. One advantage that optical fibers have over coaxial cables is that a much greater amount of information can be carried on an optical fiber.

While the FTTH optical network architecture has been a dream of many data service providers because of the aforementioned capacity of optical fibers, implementing the FTTH optical network architecture may encounter some problems associated with legacy systems that are in current use by subscribers. For example, many subscribers of video service providers use set top terminals (STTs), also known as video service terminals (VSTs), to receive and transmit information related to video services. The conventional VSTs are coupled to a coaxial cable. The coaxial cable, in turn, is then connected to fiber optic cables in a hybrid fiber-coax (HFC) system. The coaxial cable from the VSTs in combination with the fiber optic cables can provide a two way communication path between the VST and the data service hub for purposes such as authorizing a subscriber to view certain programs and channels.

For example, conventional VSTs coupled to coaxial cables may provide impulse pay-per-view services. Impulse pay-per-view services typically require two way communications between the VST and the data service provider. Another exemplary service that may require two-way communication passed between the VST and the data service provider is video-on-demand (VOD) services.

For video on demand services, a subscriber can request a program of his choosing to be played at a selected time from a central video file server at the data service hub. The subscriber's VOD program request is transmitted upstream on a return channel that comprises coaxial cables coupled to fiber optic cables. With the VOD service, a subscriber typically expects VCR-like control for these programs which includes the ability to "stop" and "play" the selected program as well as "rewind" and "fast forward" the program.

In conventional HFC systems, a return RF path from the subscriber to the data service hub is provided. The RF return path is needed because a conventional VST usually modulates its video service upstream data onto an analog RF carrier. While the video service upstream data may be modulated onto an RF carrier, it is recognized that the upstream data may be in digital form.

An RF return path typically comprises two-way RF distribution amplifiers with coaxial cables and two-way fiber optic nodes being used to interface with fiber optic cables. A pair of fiber optic strands can be used to carry the radio frequency signals between the data service hub and node in an analog optical format. Each optical cable of the pair of fiber optic strands carries analog RF signals: one carries analog RF signals in the downstream direction (toward the subscriber) while the other fiber optic cable carries analog RF signals in the reverse or upstream direction (from the subscriber). In a more recent embodiment, the upstream spectrum (typically 5-42 MHz in North America) is digitized at the node. The digital signals are transmitted to the data service hub, where they are converted back to the analog RF spectrum of 5-42 MHz. This process typically uses high data rates (at least 1.25 Gb/s) and a fiber or wavelength dedicated to return traffic from one or two nodes.

Unlike HFC systems, conventional FTTH systems typically do not comprise a return RF path from the subscriber to the data service hub because most of the return paths comprise only fiber optic cables that propagate digital data signals as opposed to analog RF signals. In conventional FTTH systems, a downstream RF path is usually provided because it is needed for the delivery of television programs that use conventional RF broadcast signals.

This downstream RF path can support RF modulated analog and digital signals as well as RF modulated control signals for any VSTs that may be used by the subscriber. However, as noted above, conventional FTTH systems do not provide for any capability of supporting a return RF path for RF analog signals generated by the legacy VST.

Another problem with some legacy VSTs and their corresponding video services controller in the data service hub (referred to as the head-end in industry) relates to the timing between downstream RF signals originating from the data service hub and the upstream RF signals generated by a legacy VST in response to the downstream RF signals. One common standard used by the video services industry in which timing between downstream and upstream RF signals is critical is the SCTE 55-2 2002 standard entitled, "Digital Broadband Delivery System: Out of Band Transport Part 2: Mode B."

The SCTE 55-2 2002 standard is known to those of ordinary skill in the art as a time division multiple access (TDMA) protocol. In a TDMA protocol, each VST is assigned a time interval during which it is to send a message to the data service hub. It may send its message during that time and only during that time interval. The assigned time intervals are controlled by the data service hub, which sends timing assignments to each VST, and which also sends a master time reference, from which each VST measures time in order to locate its message transmission time. Thus, there is a close connection between the downstream time reference and the upstream time at which each VST transmits.

To address TDMA protocols that are used in a FTTH system, one conventional solution creates frequently-recurring time slots referred to as interstitials. One such RF return path solution that uses interstitials is described in commonly owned, U.S. Non-provisional patent application Ser. No. 10/041,299, filed in the name of Farmer et al. on Jan. 8, 2002 and entitled, "METHOD AND SYSTEM FOR PROVIDING A RETURN PATH FOR SIGNALS GENERATED BY LEGACY TERMINALS IN AN OPTICAL NETWORK," the entire contents of which are hereby incorporated by reference.

These interstitials or interstitial time slots are reserved for any VST that needs to communicate with the data service hub. RF return signals can be processed and transported to the data service hub using these interstitial time slots. At the data service hub, the data in the interstitial time slots can be used to reconstruct the RF return signals into their original analog form. While this conventional solution works as a viable RF return path handling TDMA protocols, the solution can be complex to implement and it can consume a large percentage of available upstream bandwidth. Consuming a large percentage of available upstream bandwidth can reduce the ability of the FTTH system to handle other types of data.

Another problem with some TDMA protocols such as those based on the SCTE 55-2 2002 standard is the handling and processing of control messages. Control messages can include information that is exchanged between a subscriber's VST and a video services controller at a data service hub. The control messages can include information relating to establishing a timing offset for each VST handled by a data service hub. The timing offset can compensate for the distance between a respective VST and the data service hub. Other control messages can include, but are not limited to, power level control messages. Power level control messages can instruct a VST to adjust its RF return signal to a power level such that when the RF return signal is received at the data service hub, it is at sufficient level for processing by the video services controller.

The problem with control messages is that the are designed to work in a conventional HFC plant in which the video services controller expects a response. While it is possible to modify the software in the video service controller of the data service hub to disregard control messaging, it is not always practical and economical to modify the software in the VSTs to disregard this functionality of a TDMA protocol such as those based on the SCTE 55-2 2002 standard.

Another conventional solution for providing an RF return path that has been developed for handling various video service protocols packetizes RF return signals as IP packets and transports them upstream to the data service hub. One such packetizing RF return path is described in a commonly owned, U.S. Non-provisional patent application Ser. No. 10/389,267, filed in the name of Farmer et al. on Mar. 14, 2003 and entitled, "METHOD AND SYSTEM FOR PROVIDING A RETURN PATH FOR SIGNALS GENERATED BY LEGACY TERMINALS IN AN OPTICAL NETWORK," the entire contents of which are hereby incorporated by reference.

While this direct packetizing of RF return signals can handle some video service protocols, it does not work for TDMA protocols such as those based on the SCTE 55-2 2002 standard. The direct packetizing of RF return signals does not work with the SCTE 55-2 2002 standard because the solution does not maintain the critical timing between the downstream and upstream RF signals. In a packet network design of any type, many packets present themselves for transmission upstream at random times. Usually, packets are handled in the order that they are received. However, some networks have a prioritization system that determines which packets are the most critical and thus should be transmitted first. In any packet network design, packets can be of variable length, so the time it takes to transmit them is variable. This means that the time to transmit other packets will vary, depending on other traffic. The result is an undeterminable time delay in sending packets that causes unacceptable jitter in the packet arrival time of an upstream RF return signal. This is understood by one of ordinary skill in the art.

Another conventional solution to address the problems presented by TDMA legacy VST protocols, such as the SCTE 55-2 2002 standard, uses a device to demodulate the RF return signals immediately at a network subscriber's premises prior to transmission of the signals over the optical architecture. In other words, the RF return signals generated by a VST are immediately demodulated by a conversion device for their information content and this information content is packetized. The packetized (non-RF modulated) return data is sent to a subscriber optical interface for upstream transmission towards the data service hub over the optical architecture. Software in both the VST and the data service hub must be modified. While this approach has the advantage of eliminating the need to handle radio-frequency (RF) modulated signals over the optical architecture, the approach has several major disadvantages. One of the main disadvantages is cost. The conversion device is a very expensive unit (on a per unit basis) that is needed at a network subscriber's premises in addition to a subscriber optical interface that is used to convert electrical energy into optical energy for transmission over the optical network.

Accordingly, there is a need in the art for the system and method for communicating optical signals between a data service provider and a subscriber that eliminates the use of the coaxial cables and the related hardware and software necessary to support the data signals propagating along the coaxial cables. There is also a need in the art for a system and method that provides a return path for RF signals that are generated by legacy video VSTs that may use TDMA protocols, such as protocols based on the SCTE 55-2 2002 standard.

An additional need exists in the art for a method and system for communicating optical signals between a data service provider and a subscriber that can support a TDMA protocol in which timing between upstream and downstream RF modulated signals is important or critical (or both). A further need exists in the art for supporting TDMA protocols that use RF modulated control messages for optimizing information exchanged between VSTs and a video services controller in a data service hub. Another need exists in the art for supporting legacy video service controllers and VSTs with an all optical network architecture.

SUMMARY OF THE INVENTION

The present invention is generally drawn to a system and method for efficient propagation of data and broadcast RF signals over an optical fiber network. More specifically, the present invention is generally drawn to an optical network architecture that can provide a return path for RF signals that are generated by existing legacy video service terminals (VSTs). VSTs can comprise set top terminals or other like communication devices that may employ RF carriers to transmit upstream information to a data service hub.

According to one exemplary aspect, an RF return path can comprise a subscriber optical interface and a data service hub and the corresponding optical architecture between these two devices. In the data service hub, RF packets comprising a digitized RF return signal can be converted back to the electrical domain from the optical domain with an optical receiver, along with all other non-RF return data present in the packets. The RF return packets may be separated from other upstream packets by an internet router.

The separated RF packets can then be demodulated and converted to normal Ethernet packets with a digitized-RF-to-packet converter (DRPC). This DRPC can comprise a digital demodulator for processing the RF return signal that was previously digitized at the subscriber optical interface as will be discussed below. The DRPC can demodulate the RF return digital signal and convert it to a conventional or standard data packet. The DRPC can add any formatting information as needed to expand the packet to a regular or standard packet of data. Once the RF packet is converted to a regular Ethernet packet by the DRPC, the Ethernet packet can be processed by an Ethernet switch. The Ethernet switch can process the packet containing the RF return data and then feed the resulting RF return information to the video services controller.

With this architecture, the present invention can support TDMA protocols such as the protocols based on the SCTE 55-2 2002 standard. The present invention can provide an RF return path for legacy video service terminals (VSTs) that use either a query-response protocol, a contention protocol, or a TDMA protocol. In other words, the present invention can support video service terminals in which the timing of upstream RF signals to the video service controllers is not critical, such as the SCTE 55-1 Standard. In the query-response protocol, the data service hub or headend communicates with a particular subscriber optical interface that has a VST and waits for a response from the VST. But as noted above, the present invention can also handle TDMA protocols in which timing between downstream and upstream RF signals is critical such as TDMA protocols based on the SCTE 55-2 2002 standard.

According to an alternate exemplary embodiment, the data service hub may further comprise a message simulator. This message simulator can be coupled to and controlled by the DRPC. The message simulator can also be coupled to the output of an RF transmitter and to the input of an RF receiver. The RF transmitter and RF receiver can support communications for the video services controller.

The message simulator that is coupled to the RF transmitter and RF receiver can monitor the RF transmitter for control messages originating from the video services controller. As noted above these control messages can include power level adjustment requests as well as timing offset information. When the message simulator determines that a message has been sent by the video services controller, it can forward the message to the DRPC for processing or it can compare the message against information that it has received from the DRPC. As appropriate, it can return a response to the RF receiver, which response would simulate a response from a VST.

Before a message is sent by the video services controller, the DRPC can be constantly monitoring the amplitude of the RF return signal it receives from each VST. The DRPC can also identify each address of a respective VST. If a RF return signal from a VST is too low, the DRPC can instruct the message simulator to send a low RF amplitude "no operation" response to the RF receiver when the video services controller sends a query to that VST. This response will cause the RF transmitter to command the VST to increase its output level, which is a desired response in this case.

For timing offset messages originating from the video services controller, the message simulator can send a "fake" or "artificial" response with the correct header indicating that the timing offset was successfully received by a VST. With the timing offset and power level responses, the message simulator and DRPC can "fake out" or fool the video service controller into thinking that the control messages are being handled by the VST in an appropriate manner. In this way, a video services controller using a TDMA protocol with control message handing can be used with an optical architecture with little or no modifications to the protocol.

For the portion of the return path that may be housed in a subscriber optical interface, the subscriber optical interface may comprise an analog to digital converter where analog RF electrical signals produced by a video service terminal are converted to digital electrical signals. The return path in the subscriber optical interface may further comprise a data scaler that shortens or reduces the size of the digitized RF electrical signals.

A data conditioner can be coupled to the data reducer for generating identification information that is linked to the digitized and reduced RF signals to form RF packets. That is, an RF packet can comprise digitized and reduced RF signals that are coupled with identification information generated by the data conditioner. According to a preferred and an exemplary embodiment, the RF packets are formatted as Ethernet packets. However, other packet formats are not beyond the scope and spirit of the present invention It is noted that a synonym in the art for the term "packet" is the term "cell." Such use of the term "cell" exists in ATM network literature.

The data conditioner may further comprise a buffer such as a FIFO for speeding up the transmission rate of the RF packets. This increase in transmission rate of the RF packets is an important feature of the present invention. A switch connected to the data conditioner and processor can be controlled by the processor of the subscriber optical interface. The switch may be activated at appropriate times to combine the RF packets with data signals destined for a data service hub.

More specifically, the RF packets may be inserted between upstream packets comprising data generated by a subscriber with a communication device such as a computer or internet telephone. The term "upstream" can define a communication direction where a subscriber originates a data signal that is sent upwards towards a data service hub of an optical network. Conversely, the term "downstream" can define a communication direction where a data service hub originates a data signal that is sent downwards towards subscribers of an optical network.

In one exemplary embodiment of the present invention, the subscriber optical interface converts upstream analog RF signals from the VST into digitized RF Signals. First, the analog signals from the legacy terminal are filtered with a low pass filter that can part of a diplexer. Then the RF signals are converted into digital signals. The digital signals can be split into two data streams. A first data stream can be mixed down to a zero frequency.

This mixing process can be driven by a local oscillator which can be frequency controlled from a phase locked loop (PLL). The frequency of the PLL can be determined by measuring the frequency of the RF signal passing out of the low pass filter. The local oscillator can be set to this measured frequency. The measured frequency can be calculated by measuring the time between a plurality of zero crossings of the digitized RF signal.

A second data stream can be mixed with the carrier signal that is at the same frequency as the first carrier or local oscillator signal, but phased ninety degrees apart from the first oscillator signal. The first and second data streams can then be scaled down in order to reduce the amount of digitized RF data transmitted. The first and second data streams can then be multiplexed into a single upstream digital signal that is propagated to a laser transceiver node and later to a data service hub.

BRIEF DESCRIPTION OF THE DRAWINGS

FIG. 1 is a functional block diagram of some core components of an exemplary optical network architecture according to an exemplary embodiment of the present convention that can support legacy video services.

FIG. 2 is a functional block diagram illustrating additional aspects of an exemplary optical network architecture according to an exemplary embodiment of the present invention.

FIG. 16 is a logic flow diagram illustrating a preferred exemplary subprocess of FIG. 11 for converting reduced RF data packets or digitized RF to regular sized packets such as Ethernet packets according to one exemplary embodiment of the present invention.

FIG. 17 is a logic flow diagram illustrating an alternate exemplary subprocess of FIG. 11 for converting reduced RF data packets or digitized RF to regular sized packets such as Ethernet packets according to one exemplary embodiment of the present invention.

DETAILED DESCRIPTION OF EXEMPLARY EMBODIMENTS OF THE INVENTION

Figure 3A:
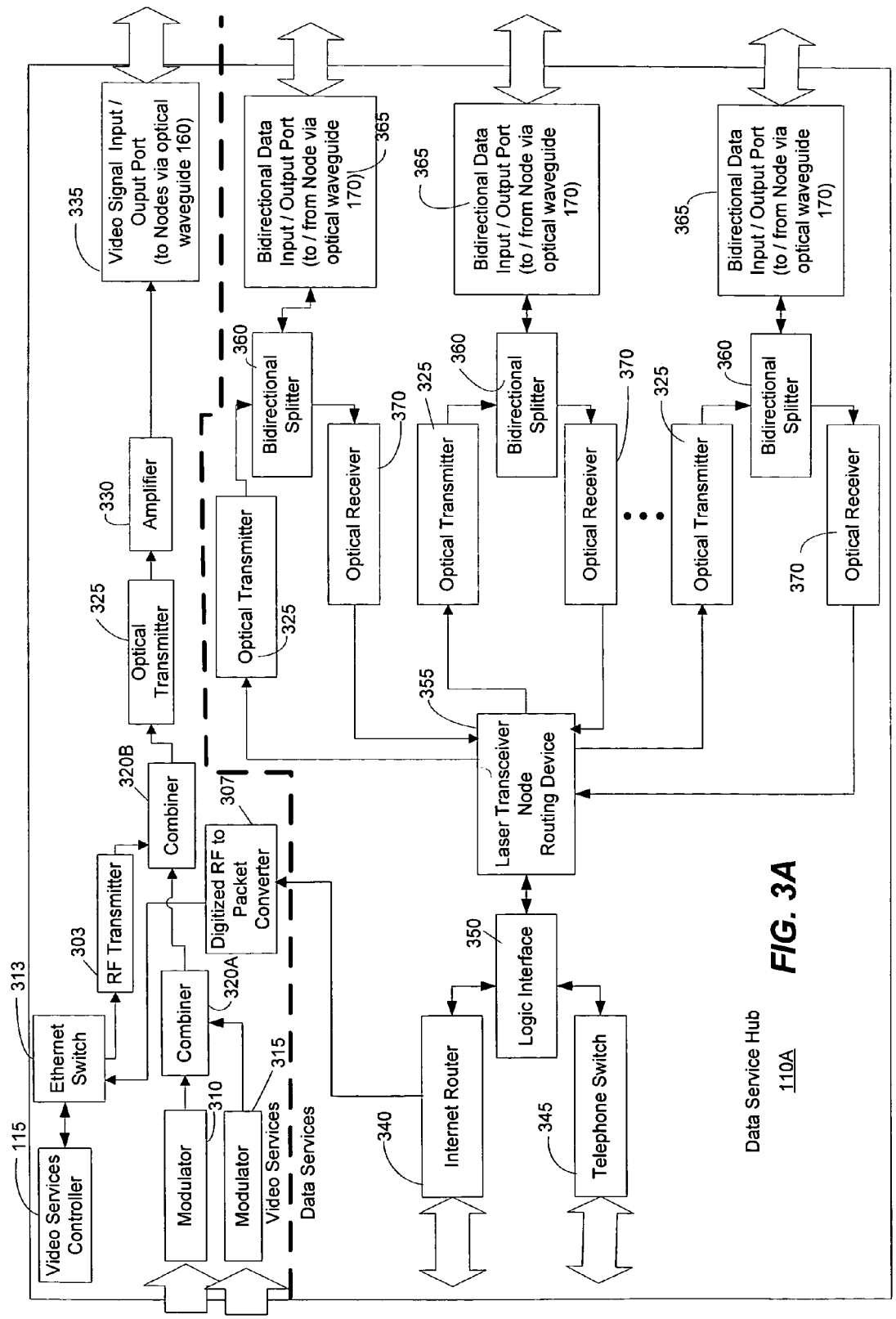
FIG. 3A is a functional block diagram illustrating an exemplary data service hub according to an exemplary embodiment of the present invention.

The present invention may be embodied in hardware or software or a combination thereof disposed within an optical network. In one exemplary embodiment, the present invention provides a method for inserting RF packets between upstream packets comprising data generated by a subscriber with a communication device such as a computer or internet telephone. In this way, the present invention can provide an RF return path for legacy video service terminals that shares a return path for regular data packets in an optical network architecture. Video service terminals (VSTs) can comprise set top terminals or other like communication devices that may employ RF carriers to transmit upstream information.

According to one exemplary embodiment, a data service hub or what is usually referred to as a head-end in industry, may comprise a digitized-RF-to-packet-converter (DRPC) that demodulates received upstream, return RF packets into standard packets such as Ethernet packets. These Ethernet packets can then be fed to an Ethernet switch that is coupled to a video service controller. The video service controller processes the information contained in these Ethernet packets. The information can include commands from a subscriber such as commands used for pay-per-view video services or video-on-demand video services, like "play," "stop," or "rewind."

In another exemplary embodiment, the data service hub may comprise a message simulator. The message simulator may be coupled to the digitized-RF-to-packet-converter (DRPC). The message simulator monitors the video services controller for control messages that may include timing offset information or requests for increased power output for RF signals generated by a particular VST. The message simulator can produce "fake", "artificial", or simulated messages in response to any messages produced by the video services controller.

Referring now to the drawings, in which like numerals represent like elements throughout the several Figures, aspects of the present invention and the illustrative operating environment will be described.

Exemplary Optical Network Architecture

FIG. 1 is a functional block diagram illustrating an exemplary optical network architecture 100 according to the present invention. The exemplary optical network architecture 100 comprises a data service hub 110 that houses a legacy video services controller 115, an Ethernet switch 313, and digitized-RF-to-packet converter (DRPC) 307. The Ethernet switch and DRPC 307 will be discussed in further detail below with respect to FIGS. 3A and 3B. The legacy video services controller 115 is typically designed to transmit and receive digital radio-frequency (RF) signals.

The legacy video services controller 115 can comprise conventional hardware that supports services such as impulse-pay-per-view and video-on-demand. However, the video services controller 115 is not limited to the aforementioned applications and can include other applications that are not beyond the scope and spirit of the present invention. In some exemplary embodiments, the video services controller 115 can be split between two locations. For example, a portion, primarily a computer, can be located in a first data service hub 110 that services a plurality of second data service hubs 110, while an RF transmitter plus one or more receivers can be located in each second data service hub 110. The first and plurality of second data service hubs 110 can be linked using any of several known communications paths and protocols.

The data service hub 110 is connected to a plurality of laser transceiver nodes 120. The laser transceiver nodes 120, in turn, are each connected to a plurality of optical taps 130. The optical taps 130 can be connected to a plurality of subscriber optical interfaces 140. Connected to each subscriber optical interface 140 can be video services terminal (VST) 117. The video services RF terminal 117 is designed to work with the video services controller 115. The video services RF terminal 117 can receive control signals from the video services controller 115 and can transmit RF-modulated digital signals back to the video services controller 115. The RF-modulated digital signals may comprise the options selected by a user.

The video services terminal 117 can permit a subscriber to select options that are part of various exemplary video services such as impulse-pay-per-view and video-on-demand. However, as noted above with respect to the video services controller 115, the present invention is not limited to the aforementioned applications and can include numerous other applications where RF analog signals are used to carry information back to the video services controller 115.

According to one exemplary embodiment, the video services controller 115 uses a TDMA protocol for upstream transmissions, in which timing between downstream and upstream RF return signals is critical. The exemplary TDMA protocol can be based on the SCTE 55-2 2002 standard, however, other TDMA protocols are not beyond the scope and spirit of the invention.

Between respective components of the exemplary optical network architecture 100 are optical waveguides such as optical waveguides 150, 160, 170, and 180. The optical waveguides 150-180 are illustrated by arrows where the arrowheads of the arrows illustrate exemplary directions of data flow between respective components of the illustrative and exemplary optical network architecture 100. While only an individual laser transceiver node 120, an individual optical tap 130, and an individual subscriber optical interface 140 are illustrated in FIG. 1, as will become apparent from FIG. 2 and its corresponding description, a plurality of laser transceiver nodes 120, optical taps 130, and subscriber optical interfaces 140 can be employed without departing from the scope and spirit of the present invention. Typically, in many of the exemplary embodiments of the RF return system of the present invention, multiple subscriber optical interfaces 140 are connected to one or more optical taps 130.

The laser transceiver node 120 can allocate additional or reduced bandwidth based upon the demand of one or more subscribers that use the subscriber optical interfaces 140. The laser transceiver node 120 can be designed to withstand outdoor environmental conditions and can be designed to hang on a strand or fit in a pedestal or "hand hole." The laser transceiver node can operate in a temperature range between minus 40 degrees Celsius to plus 60 degrees Celsius. The laser transceiver node 120 can operate in this temperature range by using passive cooling devices that do not consume power.

Unlike the conventional routers disposed between the subscriber optical interface 140 and data service hub 110, the laser transceiver node 120 does not require active cooling and heating devices that control the temperature surrounding the laser transceiver node 120. The RF system of the present invention attempts to place more of the decision-making electronics at the data service hub 110 instead of the laser transceiver node 120. Typically, the decision-making electronics are larger in size and produce more heat than the electronics placed in the laser transceiver node of the present invention. Because the laser transceiver node 120 does not require active temperature controlling devices, the laser transceiver node 120 lends itself to a compact electronic packaging volume that is typically smaller than the environmental enclosures of conventional routers. Further details of the components that make up the laser transceiver node 120 will be discussed in further detail below with respect to FIG. 4.

In one exemplary embodiment of the present invention, three trunk optical waveguides 160, 170, and 180 (that can comprise optical fibers) can propagate optical signals from the data service hub 110 to the laser transceiver node 120. It is noted that the term "optical waveguide" used in the present application can apply to optical fibers, planar light guide circuits, and fiber optic pigtails and other like optical waveguide components that are used to form an optical architecture.

A first optical waveguide 160 can carry downstream broadcast video and control signals generated by the video services controller 115. The signals can be carried in a traditional cable television format wherein the broadcast signals are modulated onto carriers, which in turn, modulate an optical transmitter (not shown in this Figure) in the data service hub 110. The first optical waveguide 160 can also carry upstream RF signals that are generated by respective video service terminals 117. However, according to one preferred exemplary embodiment, the upstream RF return signals are carried on an upstream optical waveguide 170 while downstream RF signals are carried on a dedicated downstream optical waveguide 160.

The second optical waveguide 170 can carry upstream and downstream targeted services such as data and telephone services to be delivered to or received from one or more subscriber optical interfaces 140. In addition to carrying subscriber-specific optical signals, the second optical waveguide 170 can also propagate internet protocol broadcast packets, as is understood by those skilled in the art.

In one exemplary embodiment, a third optical waveguide 180 can transport data signals upstream from the outdoor laser transceiver node 120 to the data service hub 110. The optical signals propagated along the third optical waveguide 180 can also comprise data and telephone services received from one or more subscribers. Similar to the second optical waveguide 170, the third optical waveguide 180 can also carry IP broadcast packets, as is understood by those skilled in the art.

The third or upstream optical waveguide 180 is illustrated with dashed lines to indicate that it is merely an option or part of one exemplary embodiment according to the present invention. In other words, the third optical waveguide 180 can be removed. In another exemplary embodiment, the second optical waveguide 170 propagates optical signals in both the upstream and downstream directions as is illustrated by the double arrows depicting the second optical waveguide 170.

In such an exemplary embodiment where the second optical waveguide 170 propagates bidirectional optical signals, only two optical waveguides 160, 170 would be needed to support the optical signals propagating between the data server's hub 110 in the outdoor laser transceiver node 120. In another exemplary embodiment (not shown), a single optical waveguide can be the only link between the data service hub 110 and the laser transceiver node 120. In such a single optical waveguide embodiment, three different wavelengths can be used for the upstream and downstream signals. Alternatively, bi-directional data could be modulated on one wavelength.

In one exemplary embodiment, the optical tap 130 can comprise an 8-way optical splitter. This means that the optical tap 130 comprising an 8-way optical splitter can divide downstream optical signals eight ways to serve eight different subscriber optical interfaces 140. In the upstream direction, the optical tap 130 can combine the optical signals received from the eight subscriber optical interfaces 140.

In another exemplary embodiment, the optical tap 130 can comprise a 4-way splitter to service four subscriber optical interfaces 140. Yet in another exemplary embodiment, the optical tap 130 can further comprise a 4-way splitter that is also a pass-through tap meaning that a portion of the optical signal received at the optical tap 130 can be extracted to serve the 4-way splitter contained therein while the remaining optical energy is propagated further downstream to another optical tap or another subscriber optical interface 140. The present invention is not limited to 4-way and 8-way optical splitters. Other optical taps having fewer or more than 4-way or 8-way splits are not beyond the scope of the present invention.

Exemplary Optical Network Architecture—Subscriber Groupings

Referring now to FIG. 2, this Figure is a functional block diagram illustrating an exemplary optical network architecture 100 that further includes subscriber groupings 200 that correspond with a respective outdoor laser transceiver node 120. FIG. 2 illustrates the diversity of the exemplary optical network architecture 100 where a number of optical waveguides 150 connected between the outdoor laser transceiver node 120 and the optical taps 130 is minimized. FIG. 2 also illustrates the diversity of subscriber groupings 200 that can be achieved with the optical tap 130.

Each optical tap 130 can comprise an optical splitter. The optical tap 130 allows multiple subscriber optical interfaces 140 to be coupled to a single optical waveguide 150 that is connected to the outdoor laser transceiver node 120. In one exemplary embodiment, six optical fibers 150 are designed to be connected to the outdoor laser transceiver node 120. Through the use of the optical taps 130, sixteen subscribers can be assigned to each of the six optical fibers 150 that are connected to the outdoor laser transceiver node 120.

In another exemplary embodiment, twelve optical fibers 150 can be connected to the outdoor laser transceiver node 120 while eight subscriber optical interfaces 140 are assigned to each of the twelve optical fibers 150. Those skilled in the art will appreciate that the number of subscriber optical interfaces 140 assigned to a particular waveguide 150 that is connected between the outdoor laser transceiver node 120 and a subscriber optical interface 140 (by way of the optical tap 130) can be varied or changed without departing from the scope and spirit of the present invention. Further, those skilled in the art recognize that the actual number of subscriber optical interfaces 140 assigned to the particular fiber optic cable is dependent upon the amount of power available on a particular optical fiber 150.

As depicted in subscriber grouping 200, many configurations for supplying communication services to subscribers are possible. For example, while optical tap $130_A$ can connect subscriber optical interfaces $140_{A1}$ through subscriber optical interface $140_{AN}$ to the outdoor laser transmitter node 120, optical tap $130_A$ can also connect other optical taps 130 such as optical tap $130_{AN}$ to the laser transceiver node 120. The combinations of optical taps 130 with other optical taps 130 in addition to combinations of optical taps 130 with subscriber optical interfaces 140 are limitless. With the optical taps 130, concentrations of distribution optical waveguides 150 at the laser transceiver node 120 can be reduced. Additionally, the total amount of fiber needed to service a subscriber grouping 200 can also be reduced.

With the active laser transceiver node 120 of the present invention, the distance between the laser transceiver node 120 and the data service hub 110 can comprise a range between 0 and 80 kilometers. However, the present invention is not limited to this range. Those skilled in the art will appreciate that this range can be expanded by selecting various off-the-shelf components that make up several of the devices of the present system.

Those skilled in the art will appreciate that other configurations of the optical waveguides disposed between the data service hub 110 and outdoor laser transceiver node 120 are not beyond the scope of the present invention. Because of the bi-directional capability of optical waveguides, variations in the number and directional flow of the optical waveguides disposed between the data service hub 110 and the outdoor laser transceiver node 120 can be made without departing from the scope and spirit of the present invention.

Exemplary Data Service Hub

Referring now to FIG. 3A, this functional block diagram illustrates an exemplary data service hub 110 of the present invention. The exemplary data service hub 110 illustrated in FIG. 3 is designed for a two trunk optical waveguide system. That is, this data service hub 110 of FIG. 3 is designed to send and receive optical signals to and from the outdoor laser transceiver node 120 along the first optical waveguide 160 and the second optical waveguide 170. With this one exemplary embodiment, both the first optical waveguide 160 and the second optical waveguide 170 can support bi-directional data flow. In this way, the third optical waveguide 180 discussed above is not needed. However, at the time of this writing, the three-waveguide system is one preferred, exemplary embodiment of the system.

The data service hub 110 can comprise one or more modulators 310, 315 that are designed to support television broadcast services. The one or more modulators 310, 315 can be analog or digital type modulators. In one exemplary embodiment, there can be at least 78 modulators present in the data service hub 110. Those skilled in the art will appreciate that the number of modulators 310, 315 can be varied without departing from the scope and spirit of the present invention.

The signals from the modulators 310, 315 are combined in a first combiner 320A. The control signals from the video services controller 115 are sent through an Ethernet switch 313. The Ethernet switch 313 can comprise any type of switch or router as known to those of ordinary skill in the art. A preferred and exemplary embodiment is the Ethernet switch 313. The Ethernet switch 313 is used to connect any data source to any data user, including processing upstream or RF return packets from a Digitized-RF-to-Packet converter (DRPC) 307.

In a practical implementation not illustrated in any of the Figures, multiple connections between the Ethernet switch 313 and other data devices can exist. For example, the Ethernet switch 313 may also connect the Internet and a voice switch to each and every Laser Transceiver Node 120. That is, a connection between the Ethernet switch 313 and the Internet Router 340, and the logic interface 350 could exist. A common configuration (not illustrated) would be to combine elements 313, 340, 350, 355, 325, 370, and 360 of FIG. 3A into one chassis or housing, which also could be referred to as a router or switch 313.

Downstream control signals from the video services controller 115 merely pass through the Ethernet switch 313 and are modulated on an RF carrier by an RF transmitter 303. The RF transmitter 303 feeds its downstream analog RF electrical signals into a second combiner 320B where the electrical signals from the two modulators 310, 315 are combined with the signal from RF Transmitter 303. The combined video services controller signals and broadcast video signals are supplied to an optical transmitter 325 where these signals are converted into optical form.

Those skilled in the art will recognize that a number of variations of this signal flow are possible without departing from the scope and spirit of the present invention. For example, the two combiners 320A and 320B may actually be one and the same combiner. Also, video signals may be generated at another data service hub 110 and sent to the data service hub 110 of FIG. 3 using any of a plurality of different transmission methods known to these skilled in the art. For example, some portion of the video signals may be generated and converted to optical form at a remote first data service hub 110. At a second data service hub 110, they may be combined with other signals generated locally.

The optical transmitter 325 can comprise one of Fabry-Perot (F-P) Laser Transmitters, distributed feedback lasers (DFBs), or Vertical Cavity Surface Emitting Lasers (VC-SELs). However, other types of optical transmitters are possible and are not beyond the scope of the present invention. With the aforementioned optical transmitters 325, the data service hub 110 lends itself to efficient upgrading by using off-the-shelf hardware to generate optical signals.

The optical signals generated by the optical transmitter 325 are propagated to amplifier 330 such as an Erbium Doped Fiber Amplifier (EDFA) where the optical signals are amplified. The amplified optical signals are then propagated out of the data service hub 110 via a video signal input/output port 335 which is connected to one or more first optical waveguides 160. According to one exemplary embodiment, the port 335 can comprise a unidirectional signal port for only downstream communications and not for upstream communications.

The bidirectional video signal input/output port 335 is connected to one or more first optical waveguides 160 that support bi-directional optical signals originating from the data service hub 110 and video services terminals 117.

The Digitized-RF-to-Packet-Converter (DRPC) 307 transforms RF packets back into standard packets such as Ethernet packets. Further details of the DRPC 307 will be discussed below with respect to FIGS. 9-10 and 16-17. The Ethernet packets generated by the DRPC 307 are propagated to the video services controller 115 via the Ethernet switch 313. The data service hub 110 illustrated in FIG. 3 can further comprise an Internet router 340. According to one and preferred exemplary embodiment, the internet router 340 can separate RF return packets from other data packets and send them to the DRPC 307. The data service hub 110 can further comprise a telephone switch 345 that supports telephony service to the subscribers of the optical network system 100. However, other telephony service such as Internet Protocol telephony can be supported by the data service hub 110. If only Internet Protocol telephony is supported by the data service hub 110, then it is apparent to those skilled in the art that the telephone switch 345 could be eliminated in favor of lower cost VoIP equipment. For example, in another exemplary embodiment (not shown), the telephone switch 345 could be substituted with other telephone interface devices such as a soft switch and gateway. But if the telephone switch 345 is needed, it may be located remotely from the data service hub 110 and can be connected through any of several conventional methods of interconnection.

The data service hub 110 can further comprise a logic interface 350 that is connected to a laser transceiver node routing device 355. The logic interface 350 can comprise a Voice over Internet Protocol (VoIP) gateway when required to support such a service. The laser transceiver node routing device 355 can comprise a conventional router that supports an interface protocol for communicating with one or more laser transceiver nodes 120. This interface protocol can comprise one of gigabit or faster Ethernet, or SONET protocols. However, the present invention is not limited to these protocols. Other protocols can be used without departing from the scope and spirit of the present invention.

The logic interface 350 and laser transceiver node routing device 355 can read packet headers originating from the laser transceiver nodes 120 and the internet router 340. The logic interface 350 can also translate interfaces with the telephone switch 345. After reading the packet headers, the logic interface 350 can determine where to send the packets of information.

The laser transceiver node routing device 355 can supply downstream data signals to respective optical transmitters 325. The data signals converted by the optical transmitters 325 can then be propagated to a bi-directional splitter 360. The optical signals sent from the optical transmitter 325 into the bi-directional splitter 360 can then be propagated towards a bi-directional data input/output port 365 that is connected to a second optical waveguide 170 that supports bidirectional optical data signals between the data service hub 110 and a respective laser transceiver node 120.

Upstream optical signals comprising data and RF return packets received from a respective laser transceiver node 120 can be fed into the bidirectional data input/output port 365 where the optical signals are then forwarded to the bi-directional splitter 360. From the bi-directional splitter 360, respective optical receivers 370 can convert the upstream optical signals into the electrical domain. The upstream electrical signals generated by respective optical receivers 370 are then fed into the laser transceiver node routing device 355. As noted above, each optical receiver 370 can comprise one or more photoreceptors or photodiodes that convert optical signals into electrical signals.

When distances between the data service hub 110 and respective laser transceiver nodes 120 are modest, the optical transmitters 325 can propagate optical signals at 1310 nm. But where distances between the data service hub 110 and the laser transceiver node are more extreme, the optical transmitters 325 can propagate the optical signals at wavelengths of 1550 nm with or without appropriate amplification devices.

Those skilled in the art will appreciate that the selection of optical transmitters 325 for each circuit may be optimized for the optical path lengths needed between the data service hub 110 and the outdoor laser transceiver node 120. Further, those skilled in the art will appreciate that the wavelengths discussed are practical but are only illustrative in nature. In some scenarios, it may be possible to use communication windows at 1310 and 1550 nm in different ways without departing from the scope and spirit of the present invention. Further, the present invention is not limited to a 1310 and 1550 nm wavelength regions. Those skilled in the art will appreciate that smaller or larger wavelengths for the optical signals are not beyond the scope and spirit of the present invention.

The invention according to one exemplary aspect sends RF return signals as packets and in the upstream direction over the optical waveguide 170 that is coupled to the laser transceiver node/routing device 355, logic interfaces 350, and internet router 340.

Alternate Exemplary Data Service Hub

Figure 3B:
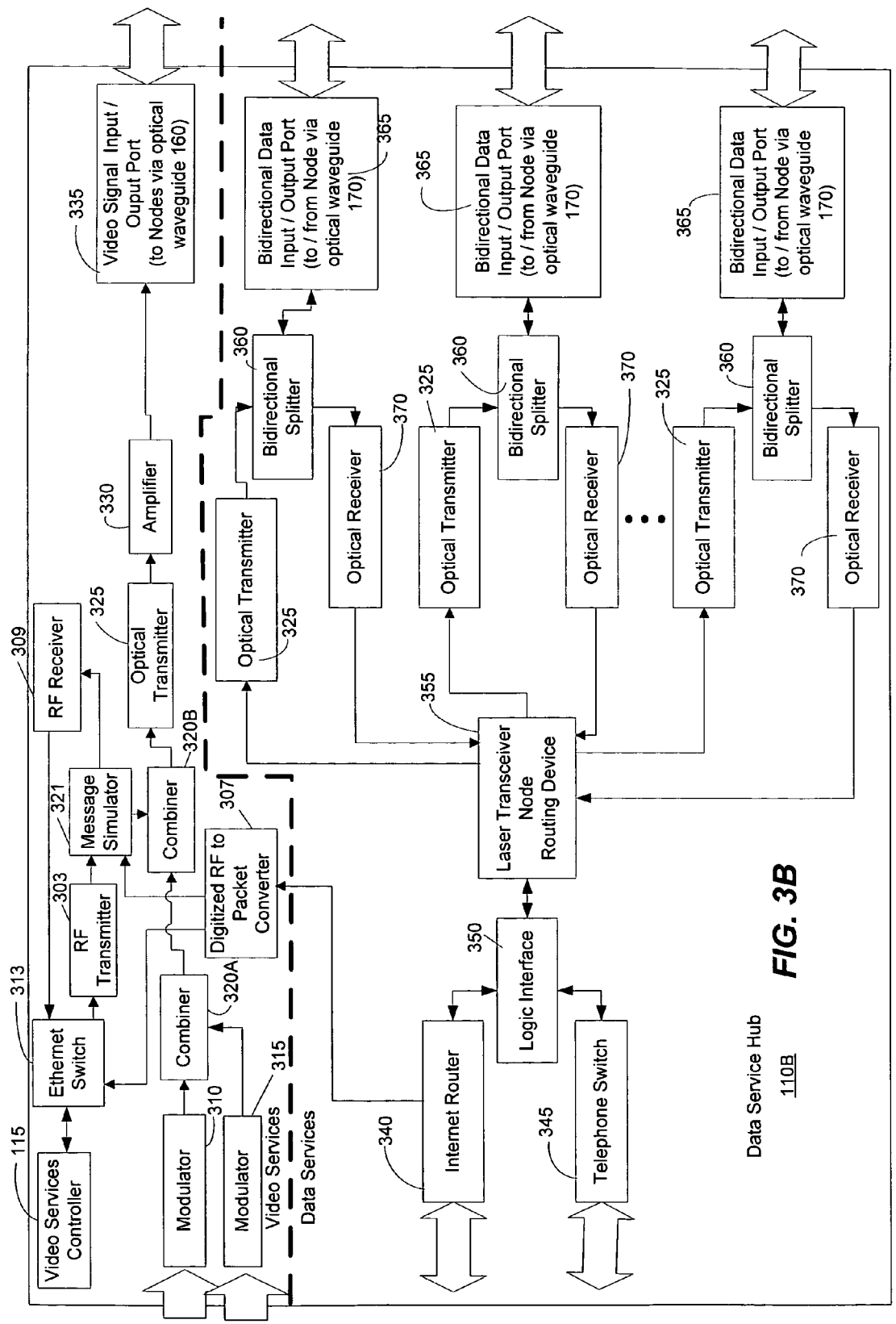
FIG. 3B is a functional block diagram illustrating an exemplary data service hub with a message simulator according to an alternate exemplary embodiment of the present invention.

Referring now to FIG. 3B, this is a functional block diagram illustrating an exemplary data service hub 110B with a message simulator 321 according to an alternate exemplary embodiment of the present invention. FIG. 3B is very similar to FIG. 3A, and therefore, only the differences between the figures will be described.

The purpose of this alternate exemplary data service hub is to permit operation with no software modifications to the Video Services Controller 115 or the Video Service Terminal 117.

The message simulator 321 can be coupled to an RF transmitter 303 for intercepting downstream transmissions from video services controller 115. The message simulator 321 can also be coupled to the RF Receiver 309 for sending upstream messages to the video services controller 115. The message simulator 321 further comprises logic to interpret downstream transmissions from RF transmitter 303 to Video Service Terminals 117, and to generate upstream transmissions to be received by RF receiver 309. The purpose is to simulate certain responses that a Video Service Terminal 117 normally makes, which must go to the RF transmitter 303 and Receiver 309.

According to one exemplary embodiment of the present invention, signals from a Video Service Terminal 117 are not sent to the RF Receiver 309. In other words, certain response communications addressing control messages will be expected by the video services controller 115 from the Video Service Terminals 117. However, according to one exemplary embodiment, such response communications between the Video Service Terminals 117 and the video services controller 115 will not take place. These response communications can include control of transmit level from the Video Service Terminal 117, and offset timing.

Instead of the system handling or managing response communications from the Video Service Terminals 117, the message simulator 321 can create false or "fake" response communications for the Video Service Terminals 117, as will be explained below. The message simulator 321 can be coupled to and controlled by the Digital-to-RF-Packet-Converter (DRPC) 307. For the specific connections between the simulator 321 and the transmitter 303 and receiver 309, the message simulator 321 can also be coupled to the output of the RF transmitter 303 and to the input of the RF receiver 309. As noted above, the RF transmitter 303 and RF receiver 309 can support communications for the video services controller 115.

The message simulator 321 that is coupled to the RF transmitter 303 and RF receiver 309 can monitor the RF transmitter 303 for control messages originating from the video services controller 115. As noted above these control messages can include power level adjustment requests as well as timing offset information. When the message simulator 321 determines that a message has been sent by the video services controller 115, it can forward the message to the DRPC 307 for processing or it can compare the message against information that it has received from the DRPC 307.

Before a message is sent by the video services controller 115, the DRPC 307 can be constantly monitoring the amplitude of the RF return signal it receives from each VST 117. The DRPC 307 can also identify each address of a respective VST. If a RF return signal from a VST 117 is too low, the DRPC 307 can instruct the message simulator 321 to send a "no operation" response to the RF receiver 309 at a low signal level at the appropriate time. This will cause the video services controller 115 to send a power level adjustment request to a particular VST 117 via RF transmitter 303.

For timing offset messages originating from the video services controller 115, the message simulator 321 can send a "fake" or "artificial" response with the correct header indicating that the timing offset was successfully received by a VST 117. With the timing offset and power level responses, the message simulator and DRPC 307 can "fake out" or fool the video service controller 115 that the control messages are being handled by the FTTH system in an appropriate manner. In this way, a video services controller FTTH using a TDMA protocol with control message handing can be used with an optical architecture with little or no modifications to the protocol.

Exemplary Laser Transceiver Node

Figure 4:
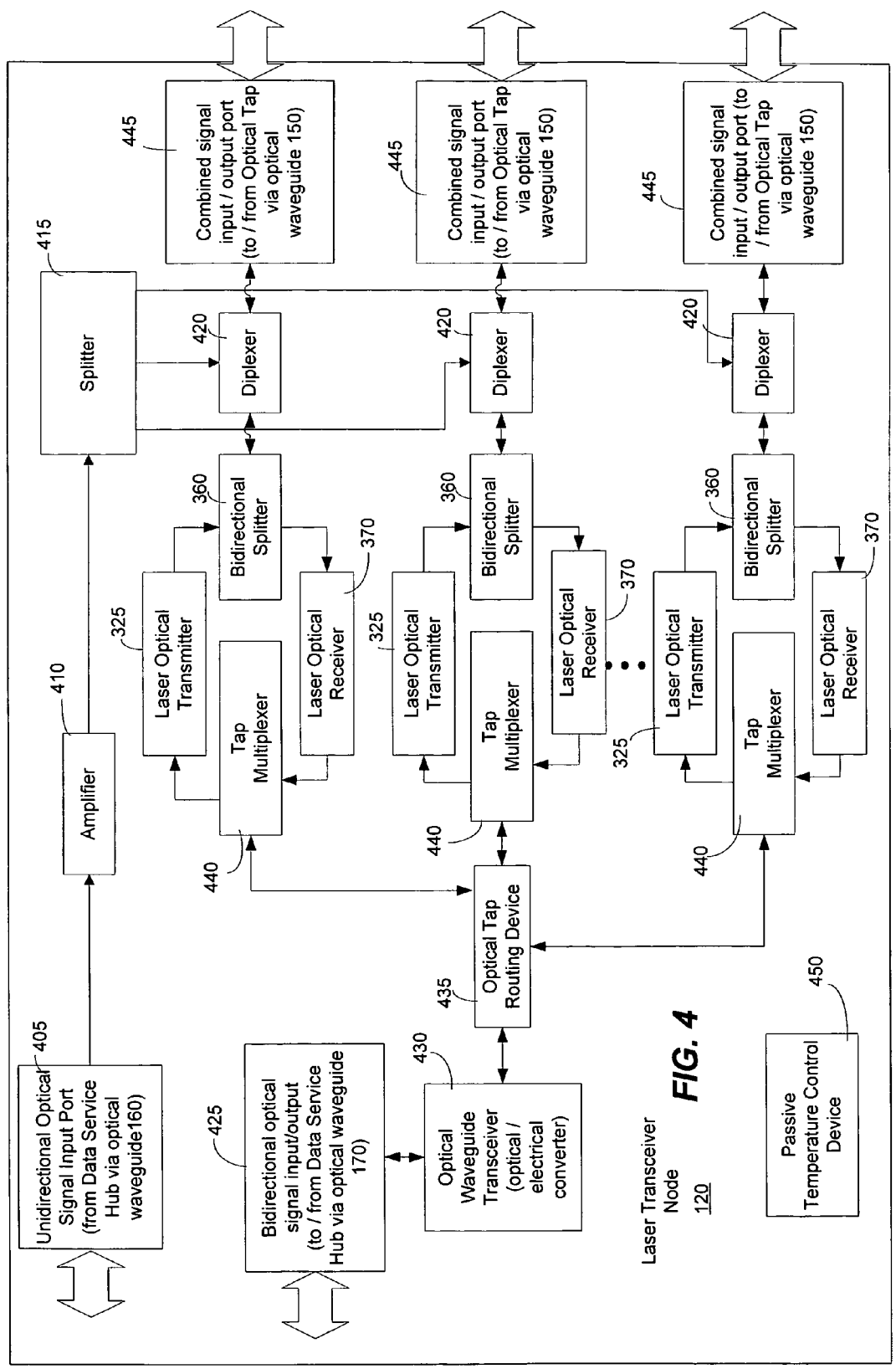
FIG. 4 is a functional block diagram illustrating an exemplary Laser Transceiver Node according to an exemplary embodiment of the present invention.

Referring now to FIG. 4, this Figure illustrates a functional block diagram of an exemplary laser transceiver node 120 of the present invention. In this exemplary embodiment, the laser transceiver node 120 can comprise a uni-directional optical signal input port 405 that can receive optical signals propagated from the data service hub 110 that are propagated along a first optical waveguide 160. The optical signals received at the uni-directional optical signal input port 405 can comprise downstream broadcast video data and downstream video service control signals.

The downstream optical signals received at the input port 405 are propagated through a an amplifier 410 such as an Erbium Doped Fiber Amplifier (EDFA) in which the optical signals are amplified. The amplified optical signals are then propagated to an optical splitter 415 that divides the downstream broadcast video optical signals and video service control signals among diplexers 420 that are designed to forward optical signals to predetermined subscriber groups 200 (referred to in FIG. 2).

The laser transceiver node 120 can further comprise a bi-directional optical signal input/output port 425 that connects the laser transceiver node 120 to a second optical waveguide 170 that supports bi-directional data flow between the data service hub 110 and laser transceiver node 120. While this is a practical embodiment, the preferred embodiment as of this writing uses two unidirectional ports and two fibers, one for downstream data and one for upstream data. Downstream optical signals flow through the bi-directional optical signal input/output port 425 to an optical waveguide transceiver 430 that converts downstream optical signals into the electrical domain. The optical waveguide transceiver further converts upstream electrical signals into the optical domain. The optical waveguide transceiver 430 can comprise an optical/electrical converter and an electrical/optical converter.

Downstream and upstream electrical signals are communicated between the optical waveguide transceiver 430 and an optical tap routing device 435. The optical tap routing device 435 can manage the interface with the data service hub optical signals and can route or divide or apportion the data service hub signals according to individual tap multiplexers 440 that communicate optical signals with one or more optical taps 130 and ultimately one or more subscriber optical interfaces 140. It is noted that tap multiplexers 440 operate in the electrical domain to modulate laser transmitters in order to generate optical signals that are assigned to groups of subscribers coupled to one or more optical taps.

Optical tap routing device 435 is notified of available upstream data packets and upstream RF packets (which are simply upstream data packets at this point in the network) as they arrive, by each tap multiplexer 440. The optical tap routing device is connected to each tap multiplexer 440 to receive these upstream data and RF packets. The optical tap routing device 435 relays the RF packets and information packets that can comprise data and/or telephony packets to the data service hub 110 via the optical waveguide transceiver 430 and bidirectional optical signal input/output 425. The optical tap routing device 435 can build a lookup table from these upstream data packets coming to it from all tap multiplexers 440 (or ports), by reading the source IP address of each packet, and associating it with the tap multiplexer 440 through which it came.

The aforementioned lookup table can be used to route packets in the downstream path. As each downstream data packet comes in from the optical waveguide transceiver 430, the optical tap routing device looks at the destination IP address (which is the same as the source IP address for the upstream packets). From the lookup table the optical tap routing device 435 can determine which port (or tap multiplexer 440) is connected to that IP address, so it sends the packet to that port. This can be described as a normal layer 3 router function as is understood by those skilled in the art.

The optical tap routing device 435 can assign multiple subscribers to a single port. More specifically, the optical tap routing device 435 can service groups of subscribers with corresponding respective, single ports. The optical taps 130 coupled to respective tap multiplexers 440 can supply downstream optical signals to pre-assigned groups of subscribers who receive the downstream optical signals with the subscriber optical interfaces 140.

In other words, the optical tap routing device 435 can determine which tap multiplexers 440 are to receive a downstream electrical signal, or identify which tap multiplexer 440 propagated an upstream optical signal (that is received as an electrical signal). The optical tap routing device 435 can format data and implement the protocol required to send and receive data from each individual subscriber connected to a respective optical tap 130. The optical tap routing device 435 can comprise a computer or a hardwired apparatus that executes a program defining a protocol for communications with groups of subscribers assigned to individual ports. Exemplary embodiments of programs defining the protocol are discussed in the following copending and commonly assigned non-provisional patent applications, the entire contents of which are hereby incorporated by reference: "Method and System for Processing Downstream Packets of an Optical Network," filed on Oct. 26, 2001 in the name of Stephen A. Thomas et al. and assigned U.S. Ser. No. 10/045,652; and "Method and System for Processing Upstream Packets of an Optical Network," filed on Oct. 26, 2001 in the name of Stephen A. Thomas et al. and assigned U.S. Ser. No. 10/045, 584.

The single ports of the optical tap routing device are connected to respective tap multiplexers 440. With the optical tap routing device 435, the laser transceiver node 120 can adjust a subscriber's bandwidth on a subscription basis or on an as needed or demand basis. The laser transceiver node 120 via the optical tap routing device 435 can offer data bandwidth to subscribers in pre-assigned increments. For example, the laser transceiver node 120 via the optical tap routing device 435 can offer a particular subscriber or groups of subscribers bandwidth in units of 1, 2, 5, 10, 20, 50, 100, 200, and 450 Megabits per second (Mb/s). Those skilled in the art will appreciate that other subscriber bandwidth units are not beyond the scope of the present invention.

Electrical signals are communicated between the optical tap routing device 435 and respective tap multiplexers 440. The tap multiplexers 440 propagate optical signals to and from various groupings of subscribers by way of laser optical transmitter 325 and laser optical receiver 370. Each tap multiplexer 440 is connected to a respective optical transmitter 325. As noted above, each optical transmitter 325 can comprise one of a Fabry-Perot (F-P) laser, a distributed feedback laser (DFB), or a Vertical Cavity Surface Emitting Laser (VCSEL). The optical transmitters produce the downstream optical signals that are propagated towards the subscriber optical interfaces 140. Each tap multiplexer 440 is also coupled to an optical receiver 370. Each optical receiver 370, as noted above, can comprise photoreceptors or photodiodes. Since the optical transmitters 325 and optical receivers 370 can comprise off-the-shelf hardware to generate and receive respective optical signals, the laser transceiver node 120 lends itself to efficient upgrading and maintenance to provide significantly increased data rates.

Each optical transmitter 325 and each optical receiver 370 are connected to a respective bi-directional splitter 360. Each bi-directional splitter 360 in turn is connected to a diplexer 420 which combines the unidirectional optical signals received from the splitter 415 with the downstream optical signals received from respective optical receivers 370. In this way, broadcast video services as well as data services can be supplied with a single optical waveguide such as a distribution optical waveguide 150 as illustrated in FIG. 2. In other words, optical signals can be coupled from each respective diplexer 420 to a combined signal input/output port 445 that is connected to a respective distribution optical waveguide 150.

Unlike the conventional art, the laser transceiver node 120 does not employ a conventional router. The components of the laser transceiver node 120 can be disposed within a compact electronic packaging volume. For example, the laser transceiver node 120 can be designed to hang on a strand or fit in a pedestal similar to conventional cable TV equipment that is placed within the "last," mile or subscriber proximate portions of a network. It is noted that the term, "last mile," is a generic term often used to describe the last portion of an optical network that connects to subscribers.

Also because the optical tap routing device 435 is not a conventional router, it does not require active temperature controlling devices to maintain the operating environment at a specific temperature. Optical tap routing device 435 does not need active temperature controlling devices because it can be designed with all temperature-rated components. In other words, the laser transceiver node 120 can operate in a temperature range between minus (−) 40 degrees Celsius to 60 degrees Celsius in one exemplary embodiment.

While the laser transceiver node 120 does not comprise active temperature controlling devices that consume power to maintain temperature of the laser transceiver node 120 at a single temperature, the laser transceiver node 120 can comprise one or more passive temperature controlling devices 450 that do not consume power. The passive temperature controlling devices 450 can comprise one or more heat sinks or heat pipes that remove heat from the laser transceiver node 120. Those skilled in the art will appreciate that the present invention is not limited to these exemplary passive temperature controlling devices. Further, those skilled in the art will also appreciate the present invention is not limited to the exemplary operating temperature range disclosed. With appropriate passive temperature controlling devices 450, the operating temperature range of the laser transceiver node 120 can be reduced or expanded.

In addition to the laser transceiver node's 120 ability to withstand harsh outdoor environmental conditions, the laser transceiver node 120 can also provide high speed symmetrical data transmissions. In other words, the laser transceiver node 120 can propagate the same bit rates downstream and upstream to and from a network subscriber. This is yet another advantage over conventional networks, which typically cannot support symmetrical data transmissions as discussed in the background section above. Further, the laser transceiver node 120 can also serve a large number of subscribers while reducing the number of connections at both the data service hub 110 and the laser transceiver node 120 itself.

The laser transceiver node 120 also lends itself to efficient upgrading that can be performed entirely on the network side or data service hub 110 side. That is, upgrades to the hardware forming the laser transceiver node 120 can take place in locations between and within the data service hub 110 and the laser transceiver node 120. This means that the subscriber side of the network (from distribution optical waveguides 150 to the subscriber optical interfaces 140) can be left entirely in-tact during an upgrade to the laser transceiver node 120 or data service hub 110 or both.

The following is provided as an example of an upgrade that can be employed utilizing the principles of the present invention. In one exemplary embodiment of the invention, the subscriber side of the laser transceiver node 120 can service six groups of 16 subscribers each for a total of up to 96 subscribers. Each group of 16 subscribers can share a data path of about 450 Mb/s speed. Six of these paths represents a total speed of 6×450=2.7 Gb/s. In the most basic form, the data communications path between the laser transceiver node 120 and the data service hub 110 can operate at 1 Gb/s. Thus, while the data path to subscribers can support up to 2.7 Gb/s, the data path to the network can only support 1 Gb/s. This means that not all of the subscriber bandwidth is useable. This is not normally a problem due to the statistical nature of bandwidth usage.

An upgrade could be to increase the 1 Gb/s data path speed between the laser transceiver node 120 and the data service hub 110. This may be done by adding more 1 Gb/s data paths. Adding one more path would increase the data rate to 2 Gb/s, approaching the total subscriber-side data rate. A third data path would allow the network-side data rate to exceed the subscriber-side data rate. In other exemplary embodiments, the data rate on one link could rise from 1 Gb/s to 2 Gb/s then to 10 Gb/s, so when this happens, a link can be upgraded without adding more optical links.

The additional data paths (bandwidth) may be achieved by any of the methods known to those skilled in the art. It may be accomplished by using a plurality of optical waveguide transceivers 430 operating over a plurality of optical waveguides, or they can operate over one optical waveguide at a plurality of wavelengths, or it may be that higher speed optical waveguide transceivers 430 could be used as shown above. Thus, by upgrading the laser transceiver node 120 and the data service hub 110 to operate with more than a single 1 Gb/s link, a system upgrade is effected without having to make changes at the subscribers' premises.

Optical Taps and Subscriber Optical Interfaces

Figure 5:
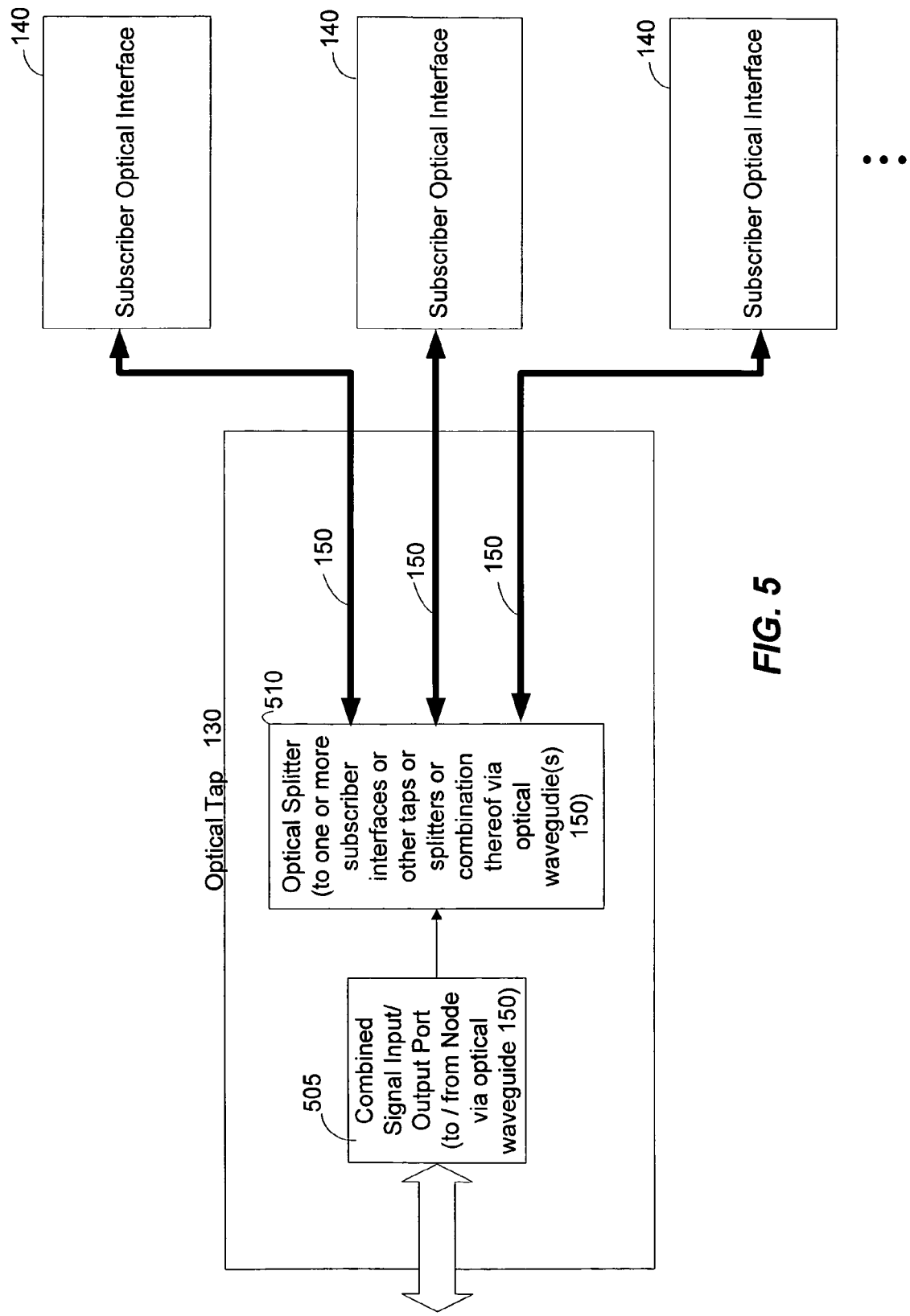
FIG. 5 is a functional block diagram illustrating an optical tap coupled to a plurality of subscriber optical interfaces according to an exemplary embodiment of the present invention.

Referring now to FIG. 5, this Figure is a functional block diagram illustrating an optical tap 130 connected to a plurality of subscriber optical interfaces 140 by optical waveguides 150 according to one exemplary embodiment of the present invention. The optical tap 130 can comprise a combined signal input/output port 505 that is connected to another distribution optical waveguide 150 that is connected to a laser transceiver node 120. As noted above, the optical taps 130 can comprise an optical splitter 510 that can be a 4-way or 8-way optical splitter. Other optical taps having fewer or more than 4-way or 8-way splits are not beyond the scope of the present invention. For example, the optical splitter 510 can comprise a three-way splitter as illustrated in FIG. 5.

The optical tap 130 can divide downstream optical signals to serve respective subscriber optical interfaces 140. In the exemplary embodiment in which the optical tap 130 comprises a 3-way optical tap, such an optical tap can be of the pass-through type, meaning that a portion of the downstream optical signals is extracted or divided to serve a 3-way splitter contained therein, while the rest of the optical energy is passed further downstream to other distribution optical waveguides 150.

The optical tap 130 is an efficient coupler that can communicate optical signals between the laser transceiver node 120 and a respective subscriber optical interface 140. Optical taps 130 can be cascaded, or they can be connected in a star architecture from the laser transceiver node 120. As discussed above, the optical tap 130 can also route signals to other optical taps that are downstream relative to a respective optical tap 130.

The optical tap 130 can also connect to a limited or small number of distribution optical waveguides 150 so that high concentrations of optical waveguides are not present at any particular laser transceiver node 120. In other words, in one exemplary embodiment, the optical tap can connect to a limited number of optical waveguides 150 at a point remote from the laser transceiver node 120 so that high concentrations of optical waveguides 150 at a laser transceiver node can be avoided. However, those skilled in the art will appreciate that the optical tap 130 can be incorporated within the laser transceiver node 120 with respect to another exemplary embodiment (not shown).

The subscriber optical interface 140 functions to convert downstream optical signals received from the optical tap 130 into the electrical domain that can be processed with appropriate communication devices. The subscriber optical interface 140 further functions to convert upstream data and RF packet electrical signals into upstream optical signals that can be propagated along a distribution optical waveguide 150 to the optical tap 130.

Exemplary Subscriber Optical Interface

Figure 6:
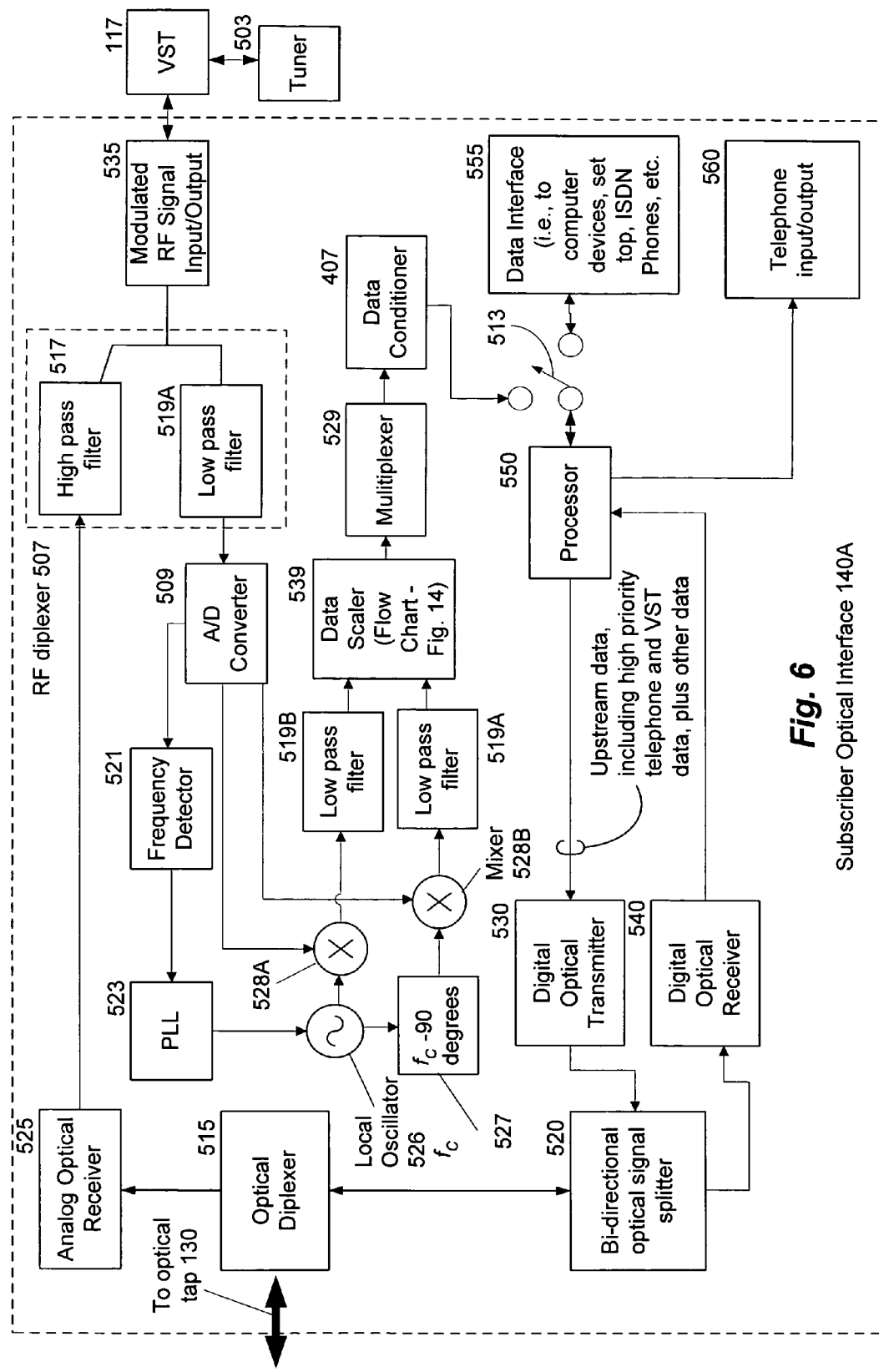
FIG. 6 is a functional block diagram illustrating a subscriber optical interface of one preferred exemplary embodiment that divides upstream RF signals into two data streams.

Referring now to FIG. 6, one exemplary embodiment of a first subscriber optical interface 140A is illustrated. The subscriber optical interface 140A can comprise an optical diplexer 515 that divides the downstream optical signals received from the distribution optical waveguide 150 between a bi-directional optical signal splitter 520 and an analog optical receiver 525. The optical diplexer 515 can receive upstream optical signals generated by a digital optical transmitter 530.

The digital optical transmitter 530 converts electrical binary/digital signals such as upstream data packets and RF packets to optical form so that the optical signals can be transmitted back to the data service hub 110. Conversely, the digital optical receiver 540 converts optical signals into electrical binary/digital signals so that the electrical data signals can be handled by processor 550. Processor 550 can comprise an application specific integrated circuit (ASIC) in combination with a central processing unit (CPU). However, other hardware or software implementations or combinations thereof are not beyond the scope and spirit of the present invention.

The RF return system of the present invention can propagate the optical signals at various wavelengths. However, the wavelength regions discussed are practical and are only illustrative of exemplary embodiments. Those skilled in the art will appreciate that other wavelengths that are either higher or lower than or between the 1310 and 1550 nm wavelength regions are not beyond the scope of the present invention.

The analog optical receiver 525 can convert the downstream broadcast optical video signals into modulated RF television signals and downstream video service control signals into analog RF signals that are propagated through an RF diplexer 507 and out of the modulated RF signal input/output 535. The modulated RF bidirectional signal input/output 535 can feed into the video services terminal 117. The video services terminal 117 can be coupled to a tuner 503 that comprises a television set or radio. The analog optical receiver 525 can process analog modulated RF transmission as well as digitally modulated RF transmissions for digital TV applications.

The bi-directional optical signal splitter 520 can propagate combined optical signals in their respective directions. That is, downstream optical signals entering the bi-directional optical splitter 520 from the optical diplexer 515, are propagated to the digital optical receiver 540. Upstream optical signals entering it from the digital optical transmitter 530 are sent to optical diplexer 515 and then to optical tap 130. The bi-directional optical signal splitter 520 is connected to a digital optical receiver 540 that converts downstream data optical signals into the electrical domain. Meanwhile the bi-directional optical signal splitter 520 is also connected to a digital optical transmitter 530 that converts upstream data packet and RF packet electrical signals into the optical domain.

The digital optical receiver 540 can comprise one or more photoreceptors or photodiodes that convert optical signals into the electrical domain. The digital optical transmitter 530 can comprise one or more lasers such as the Fabry-Perot (F-P) Lasers, distributed feedback lasers, and Vertical Cavity Surface Emitting Lasers (VCSELs). Other types of lasers are within the scope and spirit of the invention.

The digital optical receiver 540 and digital optical transmitter 530 are connected to a processor 550 that selects data intended for the instant subscriber optical interface 140 based upon an embedded address. The data handled by the processor 550 can comprise one or more of telephony and data services such as an Internet service. The processor 550 is connected to a telephone input/output 560 that can comprise an analog interface. The processor 550 is also connected to a data interface 555 that can provide a link to computer devices, ISDN phones, and other like devices.

Alternatively, the data interface 555 can comprise an interface to a Voice over Internet Protocol (VoIP) telephone or Ethernet telephone. The data interface 555 can comprise one of Ethernet (10BaseT, 100BaseT, Gigabit) interface, HPNA interface, a universal serial bus (USB) an IEEE1394 interface, an ADSL interface, and other like interfaces.

The processor 550 is also designed to create the upstream RF packets that will transport the RF signals from the video services terminal 117 to the data service hub 110. Specifically, the RF signals to be returned from the video service terminal 117 in a subscriber's home are propagated towards the modulated RF input/output signal interface 535. Each RF return signal can comprise a frequency that exists between an exemplary range of 5 and 42 MHz in North America. The RF signal can comprise an occasional burst of RF modulated data, which must be transported back to the data service hub.

When the video services terminal 117 generates RF signals, these RF signals are propagated through the modulated RF signal input/output signal interface 535 to the diplexer 507. The diplexer 507 can comprise a high pass filter 517 and a low pass filter 519. The high pass filter supports downstream analog RF signals that can comprise video content and control signals for the video service terminal 117. The low pass filter 519A can support upstream analog RF signals generated by the video service terminal 117.

The diplexer 507 passes the upstream analog RF signals to an analog-to-digital (A/D) converter 509. From the A/D converter 509, the digital RF signals can be split into two data streams. A first data stream can be mixed down to a zero frequency in a first mixer 528A by mixing the first data stream with a carrier frequency produced by a local oscillator 526. In other words, this mixing process can be driven by the local oscillator 526 which can be frequency controlled from a phase locked loop (PLL) 523. The frequency of the PLL 523 can be determined by a frequency detector 521 that measures the frequency of the RF signal at the A/D converter 509 passing out of the low pass filter. The local oscillator 526 can be set to this measured frequency. The measured frequency can be calculated by measuring the time between a plurality of zero crossings of the digitized RF signal.

A second data stream flowing out of the A/D converter 509 can be mixed in a second mixer 528B with a carrier signal that is at the same frequency as the first carrier or local oscillator signal, but phased ninety degrees apart from the first carrier signal. This phase shift of the first carrier signal can be made with a phase shifter 527. The first and second data streams flowing through the first and second mixers 528A, 528B can be propagated through low pass filters, 519B. The two data streams can then be scaled down with a data scaler 539 in order to reduce the amount of digitized RF data transmitted. While in the data reducer 539, certain algorithms are applied to reduce the amount of data transmitted. A number of algorithms related to subsampling and other techniques are known to those skilled in the art. Further details of the data scaler 539 will be discussed below with respect to FIG. 14.

The reduced data streams comprising digitized RF signals are then propagated to a multiplexer 529 where the two data streams are combined and then propagated to a data conditioner 407. The data conditioner 407 at this stage can speed up data transmission of the RF signals. The data conditioner 407 can comprise a buffer such as a FIFO that also inputs identification information with the digitized RF signals to form RF packets. That is, an RF packet can comprise digitized and reduced RF signals that are coupled with identification information.

As noted above, the RF packets can be formatted as Ethernet packets. However, other packet formats are not beyond the scope and spirit of the present invention. Reduced RF signals may enter the data conditioner 407 at an exemplary transmission speed of 40 Megabits per second (Mbps) while the newly formed RF packets exit the data conditioner 407 at an exemplary transmission speed of 500 Megabits per second (Mbps). However, other transmission speeds are not beyond the scope of the present invention.

RF packets are transferred upstream from the data conditioner 407 when a switch 513 connects the data conditioner 407 to the digital optical transmitter 530 via Processor 550. The switch 513 is controlled by processor 550. When switch 513 is not connected to the data conditioner 407, it may be connected to the output of the Data Interface 555.

In other words, the switch 513 may be activated at appropriate times to combine the upstream RF packets from the data conditioner 407 with upstream data packets from the processor 550 destined for the data service hub 110. More specifically, the RF packets may be inserted between upstream packets comprising data generated by a subscriber with a communication device such as a computer or telephone. The present invention is not limited to a discrete switch 513 as described above. The switch functionality may be incorporated into the processor 550 or other appropriate hardware device in the subscriber optical interface 140A.

Alternate Exemplary Subscriber Optical Interface

Figure 7:
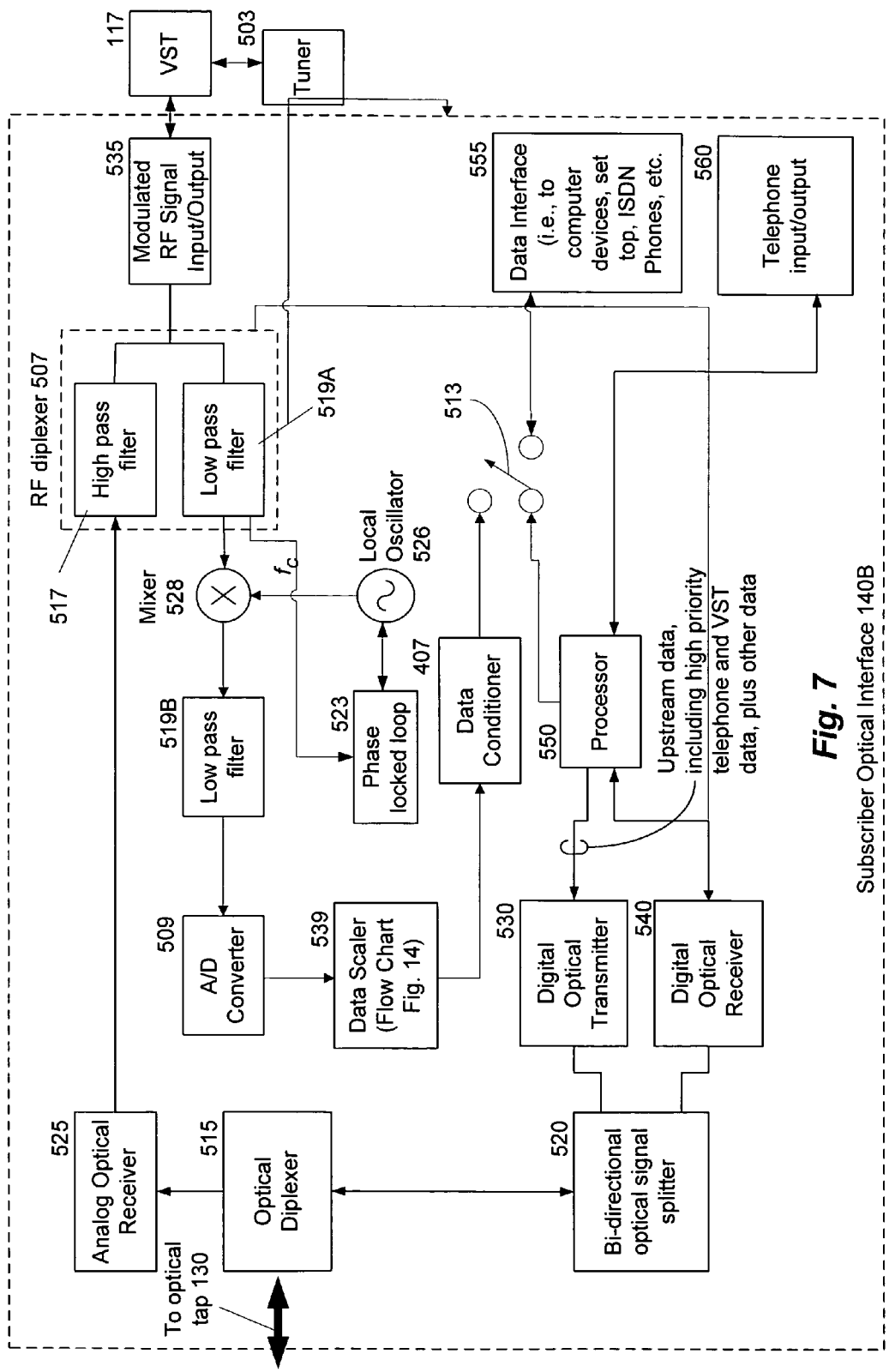
FIG. 7 is a functional block diagram illustrating a subscriber optical interface of an alternate embodiment that employs a single data stream and a phased locked loop.

Referring now to FIG. 7, this Figure is a functional block diagram illustrating a second subscriber optical interface 140B of an alternate embodiment that employs a single data stream and a phased locked loop 523. Because of the similarities between FIGS. 6 and 7, only the differences between these two figures will be described.

A control word is loaded into the phased lock loop 523 to establish a frequency of the oscillator 526. In this embodiment, the local oscillator frequency can be determined by measuring the frequency of the incoming RF signal flowing out of a first low pass filter 519A. The measured frequency can be calculated by measuring the time between a plurality of zero crossings of the RF signal. Once the measured frequency is determined, then an offset frequency can be added such that the RF signal has side bands that extend near, but do not cross, a zero frequency value.

The analog signal from the local oscillator 526 is mixed with the analog RF return signal generated by the video services terminal 117 in the mixer 528 to produce a difference frequency. The difference frequency is filtered with a second low pass filter 519B and is fed into an A/D converter 509. The difference frequency is converted to the digital domain with the A/D converter 509. The digital signals are then scaled down with the data scaler 539 to reduce the amount of data transmitted. The reduced digital signals are fed into the data conditioner 407.

The data conditioner 407 at this stage, similar to the first exemplary subscriber optical interface 140A discussed above, can speed up data transmission of the digitized RF signals. The data conditioner 407 can comprise a buffer such as a FIFO that also inputs identification information with the digitized RF signals to form RF packets. Reduced RF signals may enter the data conditioner 407 at an exemplary transmission speed of 40 Megabits per second (Mbps) while the newly formed RF packets exit the data conditioner 407 at an exemplary transmission speed of 500 Megabits per second (Mbps). However, other transmission speeds are not beyond the scope of the present invention. RF packets are transferred upstream from the data conditioner 407 when a switch 513 connects the data conditioner 407 to the digital optical transmitter 530, as discussed above similar to the first exemplary subscriber optical interface 140A.

Exemplary Frequency Plan for Subscriber Optical Interface

Figure 8:
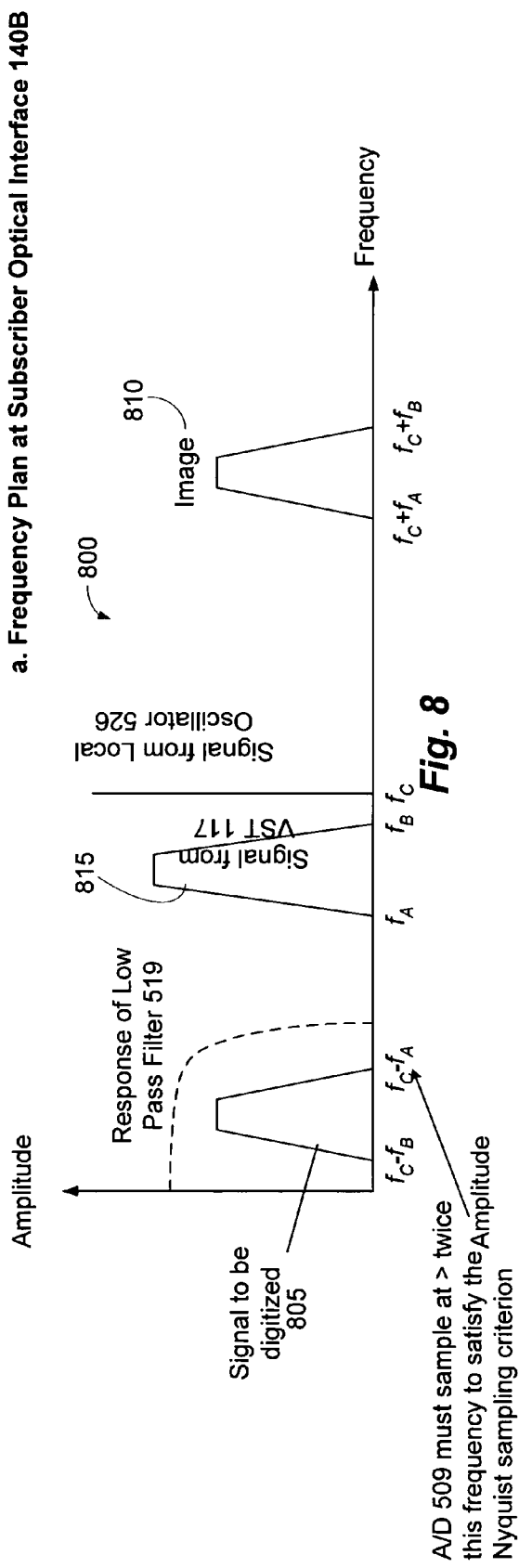
FIG. 8 is a graph illustrating a frequency plan for a subscriber optical interface according to one exemplary embodiment of the present invention.

Referring now to FIG. 8, this Figure is a graph 800 illustrating a frequency plan for the subscriber optical interface 140B of FIG. 7 according to one exemplary embodiment of the present invention. The upstream RF signal from the video services terminal 117 is extracted in the first low pass filter 519A and supplied to the mixer 528. At the mixer 528, the upstream RF signal is mixed with a carrier frequency ($f_C$) generated by the local oscillator 526. The mixer 528 produces sum and difference frequencies from these two input signals as is well understood by those skilled in the art. The difference frequency 805 is the signal that will be digitized by the A/D converter 509. The sum or image frequency 810 is not used and is eliminated by the second low pass filter 519B. The second low pass filter 519B can also eliminate any other frequency component other than the difference frequency 805 that is generated by the mixer 528. For example, the second low pass filter 519B can eliminate the base RF signal produced by the video services terminal 117 and the carrier frequency ($f_C$) generated by the local oscillator 526. From the second low pass filter 519B, the difference frequency 805 is fed into the A/D converter as discussed above with respect to FIG. 7.

Exemplary Digitized-RF-to-Packet Converter (DRPC)

Figure 9:
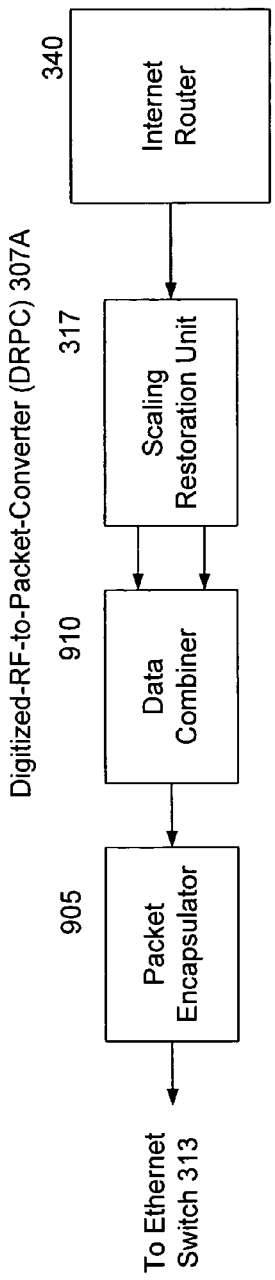
FIG. 9 is a functional block diagram illustrating some components of a Digitized-RF-to-Packet-Converter according to one preferred exemplary embodiment of the present invention.

Referring now to FIG. 9, this Figure is a functional block diagram illustrating some components of a Digitized-RF-to-Packet-Converter (DRPC) 307A according to one preferred and exemplary embodiment of the present invention. This DRPC 307A is typically used in the data service hub 110 when the first subscriber optical interface 140A discussed above is used by subscribers.

In this exemplary embodiment, the upstream RF packets are identified by the internet router 340. And generally, the DRPC 307A receives the RF packets and it can strip transmission information from the digitized RF packets. Then, the DRPC 307A can demodulate the RF return digital signal. The DRPC 307A can also add any formatting information as needed to expand the packet to a regular or standard sized packet of data.

Specifically, the DRPC 307A receives the RF data from the router 340 and this RF data is restored with a scaling restoration unit 317 that forms a portion of the DRPC 307A. Further details and steps of the scaling restoration unit 317 will be discussed below with respect to FIG. 18.

The restored packets represent the modulated RF signal at baseband, as is understood by those skilled in the art. The two outputs of the scaling restoration unit 317 are the same as the two outputs from Low Pass Filters 519B of FIG. 6. In engineering terms, the modulation format is QPSK, and these two outputs are referred to as the "i" and "q" data channels, as is understood by those skilled in the art. The data is combined in Data Combiner 910, into the original data stream prior to modulation in VST 117. The data stream is encapsulated into an Ethernet packet and any other protocols necessary (if any) are added by Packet Encapsulator 905, the output of which is supplied to Ethernet Switch 313 of FIG. 3A. For an embodiment employing the Message Simulator 321, control information for the Message Simulator 321 is computed in the Packet Encapsulator, which has the necessary information in the form of data from the VST 117.

Alternate Exemplary Digitized-RF-to-Packet-Converter (DRPC)

Figure 10:
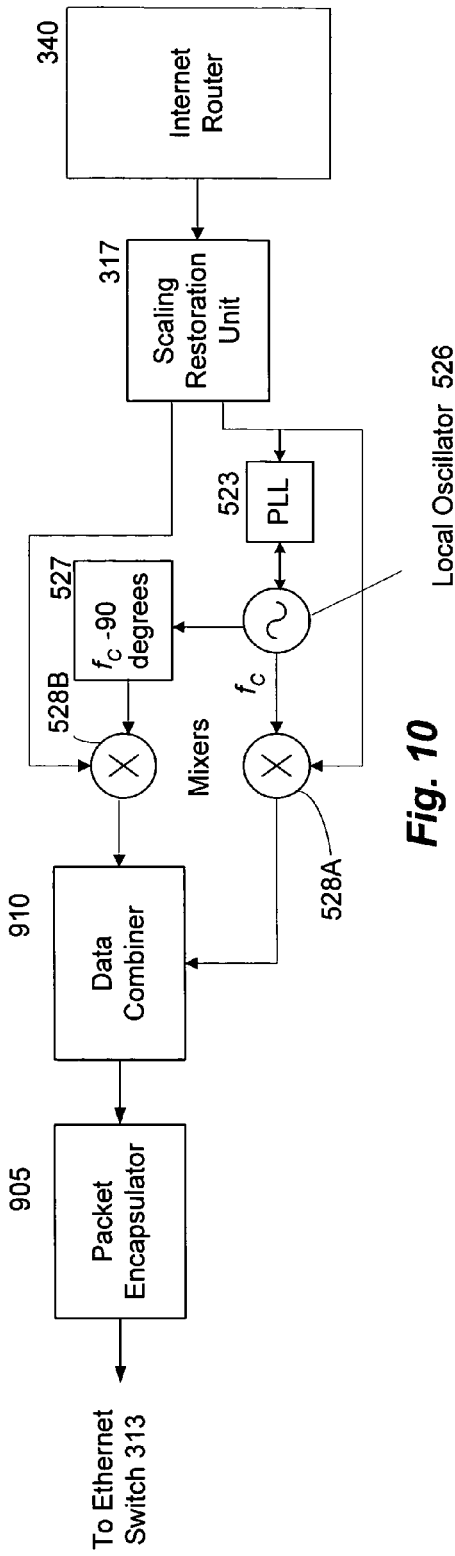
FIG. 10 is a functional block diagram illustrating some components of a Digitized-RF-to-Packet-Converter according to an alternate exemplary embodiment of the present invention.

Referring now to FIG. 10, this figure is a functional block diagram illustrating some components of another exemplary Digitized-RF-to-Packet-Converter (DRPC) 307B according to an alternate exemplary embodiment of the present invention. This second DRPC 307B is typically used in the data service hub 110 when the second subscriber optical interface 140B discussed above is used by subscribers.

Generally, the DRPC 307B receives the RF packets from the internet router 340 and it can strip transmission information from the packets containing the RF signal. Then, the DRPC 307B can demodulate the RF return digital signal. The DRPC 307B can also add formatting information as needed to send the data packet on to the Switch 313.

In this exemplary embodiment, specifically, the upstream RF packets are then used to reconstruct the original data with the scaling restoration unit 317. Further details and processing of the scaling restoration unit 317 will be discussed below with respect to FIG. 14.

During restoration, the phased locked loop 523 phase locks Local Oscillator 526 to the carrier of the incoming data, which is an RF modulated signal represented digitally. Those skilled in the art know of several ways to implement this phase locked loop, including frequency quadrupling and dividing, and use of a Costas Loop. The Local Oscillator 526, Frequency Shifter 527, and the two Mixers 528 form a conventional QPSK demodulator, as is understood by those skilled in the art. The output of the two Mixers 528 are the i and q data signals as described above, which are combined in Data Combiner 910, with the result being encapsulated using appropriate protocols such as Ethernet, in Packet Encapsulator 905. This is done as described above, and is known to those skilled in the art.

Exemplary Method for Propagating Upstream RF Signals Towards a Data Service Hub

Figure 11:
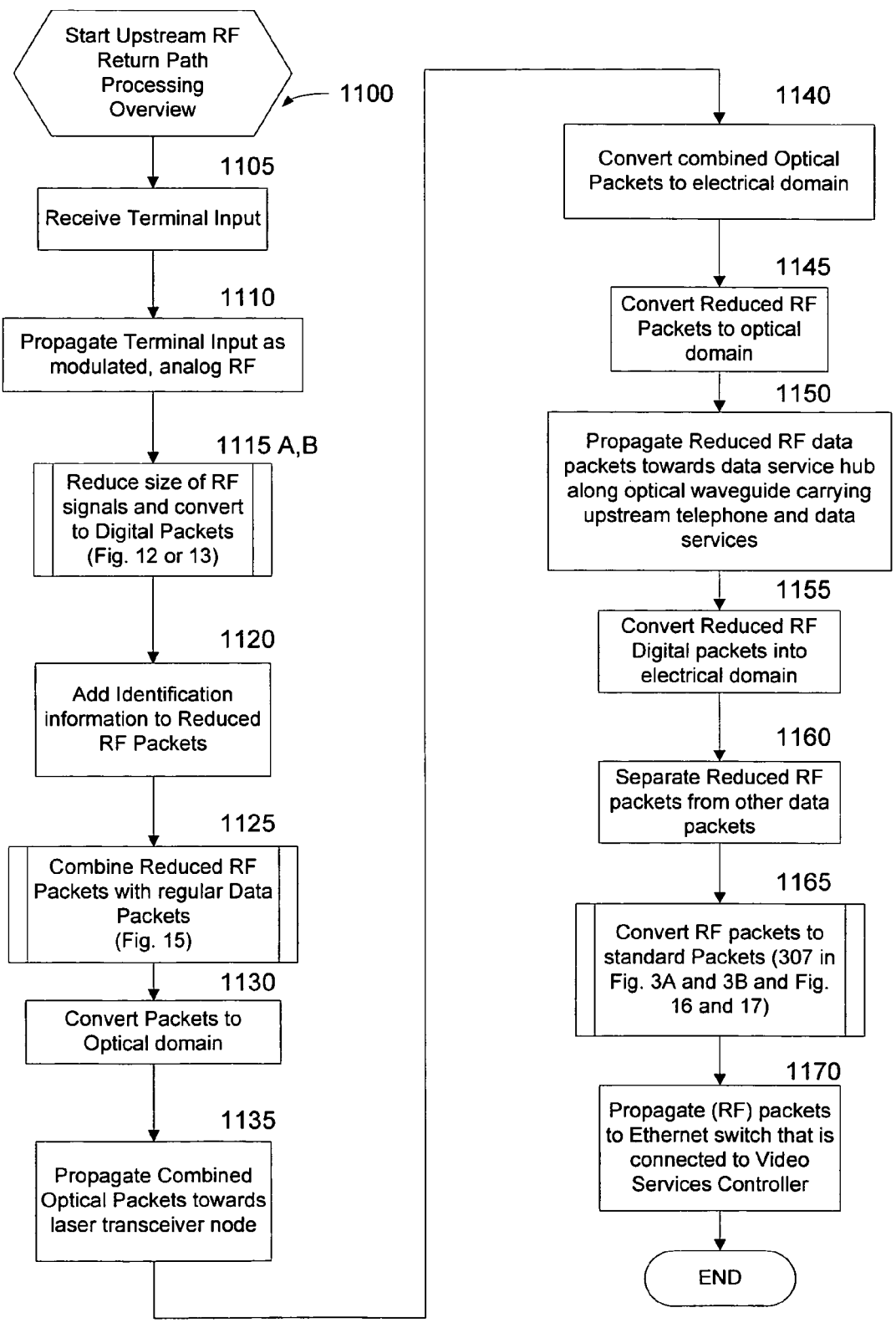
FIG. 11 is a logic flow diagram illustrating an exemplary method for propagating upstream RF signals towards a data service hub.

Referring now to FIG. 11, this Figure is a logic flow diagram illustrating an exemplary method 1100 for propagating upstream RF signals towards a data service hub 110. The description of the flow charts in the this detailed description are represented largely in terms of processes and symbolic representations of operations by conventional computer components, including a processing unit (a processor), memory storage devices, connected display devices, and input devices. Furthermore, these processes and operations may utilize conventional discrete hardware components or other computer components in a heterogeneous distributed computing environment, including remote file servers, computer servers, and memory storage devices. Each of these conventional distributed computing components can be accessible by the processor via a communication network.

The processes and operations performed below may include the manipulation of signals by a processor and the maintenance of these signals within data structures resident in one or more memory storage devices. For the purposes of this discussion, a process is generally conceived to be a sequence of computer-executed steps leading to a desired result. These steps usually require physical manipulations of physical quantities. Usually, though not necessarily, these quantities take the form of electrical, magnetic, or optical signals capable of being stored, transferred, combined, compared, or otherwise manipulated. It is convention for those skilled in the art to refer to representations of these signals as bits, bytes, words, information, elements, symbols, characters, numbers, points, data, entries, objects, images, files, or the like. It should be kept in mind, however, that these and similar terms are associated with appropriate physical quantities for computer operations, and that these terms are merely conventional labels applied to physical quantities that exist within and during operation of the computer.

It should also be understood that manipulations within the computer are often referred to in terms such as creating, adding, calculating, comparing, moving, receiving, determining, identifying, populating, loading, executing, etc. that are often associated with manual operations performed by a human operator. The operations described herein can be machine operations performed in conjunction with various input provided by a human operator or user that interacts with the computer.

In addition, it should be understood that the programs, processes, methods, etc. described herein are not related or limited to any particular computer or apparatus. Rather, various types of general purpose machines may be used with the following process in accordance with the teachings described herein.

The present invention may comprise a computer program or hardware or a combination thereof which embodies the functions described herein and illustrated in the appended flow charts. However, it should be apparent that there could be many different ways of implementing the invention in computer programming or hardware design, and the invention should not be construed as limited to any one set of computer program instructions. Further, a skilled programmer would be able to write such a computer program or identify the appropriate hardware circuits to implement the disclosed invention without difficulty based on the flow charts and associated description in the application text, for example. Therefore, disclosure of a particular set of program code instructions or detailed hardware devices is not considered necessary for an adequate understanding of how to make and use the invention. The inventive functionality of the claimed computer implemented processes will be explained in more detail in the following description in conjunction with the remaining Figures illustrating other process flows.

Certain steps in the processes or process flow described below must naturally precede others for the present invention to function as described. However, the present invention is not limited to the order of the steps described if such order or sequence does not alter the functionality of the present invention. That is, it is recognized that some steps may be performed before, after, or in parallel other steps without departing from the scope and spirit of the present invention.

Again, referring now to FIG. 11, this Figure provides an overview of the processing performed by the subscriber optical interfaces 140, laser transceiver nodes 120, and data service hub 110. Step 1105 is the first step in the exemplary upstream overview process 1100. In step 1105, terminal input is received at a video service terminal 117. Next, in step 1110, the terminal input is propagated as modulated analog RF signals towards the subscriber optical interface 140.

In routine 1115, the analog RF signals are reduced and converted to digital packets. However, it is noted that routine 1115 does not need to take place in the subscriber optical interface 140. The reduction and analog to digital conversion process can take place at the laser transceiver node 120 or it could occur at the video service terminal 117. Further details of routine 1115 will be described below with respect to FIGS. 12 and 13.

In step 1120, identification information is added to the reduced RF packet. This identification information can comprise headers used to uniquely identify RF packets from other types of data packets. The identification information may further comprise a control word used by phased locked loops 523 during the scaling and restoration processes described below. This identification information is typically supplied by the data conditioner 407. However, the functions identified in step 1120 can be accomplished with other hardware devices other than the data conditioners 407. The present invention is not limited to the hardware devices which perform the functions described in step 1220.

In routine 1125, the reduced RF return packets are combined with regular data packets. Further details of routine 1125 will be discussed below with respect to FIG. 15.

In step 1130, the combined electrical RF return packets and data packets are converted to the optical domain at the subscriber optical interface 140. Next, in step 1135, the combined optical packets are propagated towards the laser transceiver node 120 along a waveguide 150.

In step 1140, the combined optical packets are converted to the electrical domain with a digital optical receiver such as the receiver 370 of the laser transceiver node 120 as illustrated in FIG. 4. This conversion of the optical packets to the electrical domain in the laser transceiver node 120 occurs because the laser transceiver node 120 is combining data received from multiple groups of subscribers at the optical tap routing device 435. Next, in step 1145, the reduced RF packets are converted back to the optical domain by an optical waveguide transceiver 430.

In step 1150, the reduced RF packets and the regular data packets are propagated upstream towards a data service hub 110 along the optical wave guide 170 that also carries down stream data packets that can comprise telephone and data services. A preferred exemplary embodiment uses separate optical fibers for downstream and upstream transmission At the time of this writing, separate fibers from the Data Service Hub to the Laser Transceiver Node, and a single fiber from the Laser Transceiver Node to the Subscriber Optical Interface is practiced. In step 1155 the reduced RF digital packets and regular upstream data packets are converted back to the electrical domain with the optical receivers 370 of the data service hub 110.

In step 1160, the reduced RF packets are separated from the regular upstream data packets with the internet router 340. In routine 1165, the data-reduced RF packets are converted to normal data packets such as Ethernet packets. Routine 1165 describes the operation of the Digitized-RF-to-Packet Converter (DRPC) 307. Further details of routine 1165 will be described below with respect to FIGS. 16 and 17. In step 1170, the normal data packets from the VST 117 are propagated to the Ethernet switch 313.

Exemplary Method for Reducing Size of Upstream RF Signals

Figure 12:
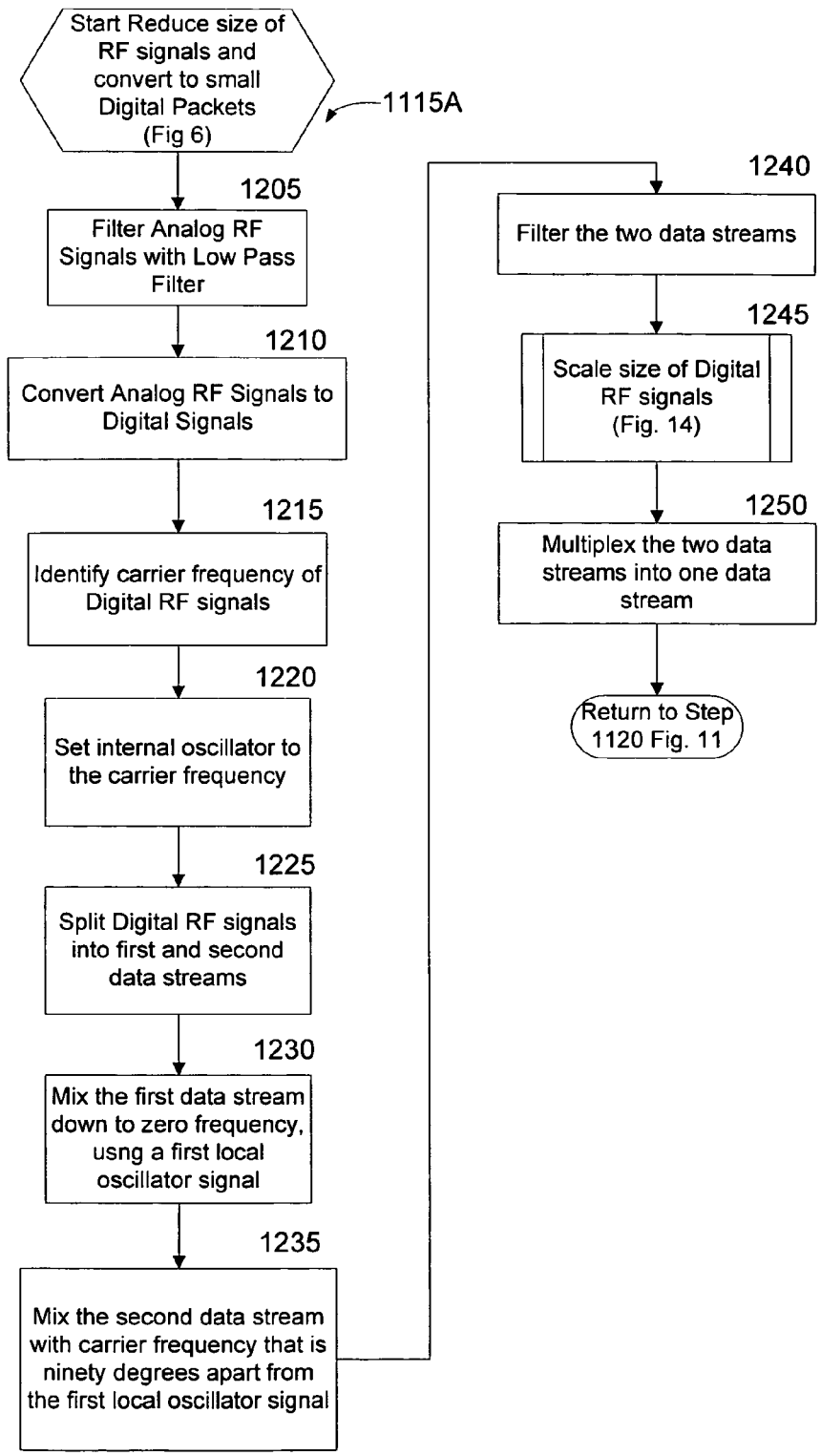
FIG. 12 is a logic flow diagram corresponding to the hardware of FIG. 6 and exemplary submethod of FIG. 11 for reducing the size of the upstream RF signals and converting the analog RF signals to digital data packets according to one exemplary embodiment of the present invention.

Referring now to FIG. 12, this Figure is a logic flow diagram corresponding to the hardware of FIG. 6 and exemplary submethod 1115A of FIG. 11 for reducing the size of the upstream RF signals and converting the analog RF signals to digital data packets according to one exemplary embodiment of the present invention. Step 1205 is the first step of the submethod 1115A in which analog RF signals are filtered with the low pass filter 519 of the diplexer 507 positioned in the subscriber optical interface 140A.

In step 1210, the diplexer 507 passes the upstream analog RF signals to an analog-to-digital (A/D) converter 509. Meanwhile, in step 1215, the frequency of the phased locked loop 523 can be determined by a frequency detector 521 that measures the frequency of the RF signal at the A/D converter 509 passing out of the low pass filter 519. The measured frequency can be calculated by measuring the time between a plurality of zero crossings of the digitized RF signal.

In step 1220, the local oscillator 526 can be set to this measured frequency. Next, in step 1225, from the A/D converter 509, the digital RF signals can be split into two identical data streams. In step 1230, a first data stream can be mixed down to a zero frequency in a first mixer 528A by mixing the first data stream with a carrier frequency produced by a local oscillator 526. In other words, this mixing process can be driven by the local oscillator 526 which can be frequency controlled from a phase locked loop (PLL) 523.

In step 1235, a second data stream flowing out of the A/D converter 509 can be mixed in a second mixer 528B with a carrier signal that is at the same frequency as the first carrier or local oscillator signal, but phased ninety degrees apart from the first carrier signal. This phase shift of the first carrier signal can be made with a phase shifter 527.

In step 1240, the first and second data streams flowing through the first and second mixers 528A, 528B can be propagated through low pass filters 519A, 519B. Next, in routine 1245, the two data streams can then be scaled down with a data scaler 539 in order to reduce the amount of digitized RF data transmitted. While in the data reducer 539, certain algorithms are applied to reduce the amount of data transmitted. A number of algorithms related to subsampling and other techniques are known to those skilled in the art. Further details of the data scaler 539 and routine 1245 will be discussed below with respect to FIG. 14.

In step 1250, the two data streams are combined and muliplexed to a data conditioner 407. The process then returns to step 1120 of FIG. 11.

Alternate Exemplary Method for Reducing Size of Upstream RF Signals

Figure 13:
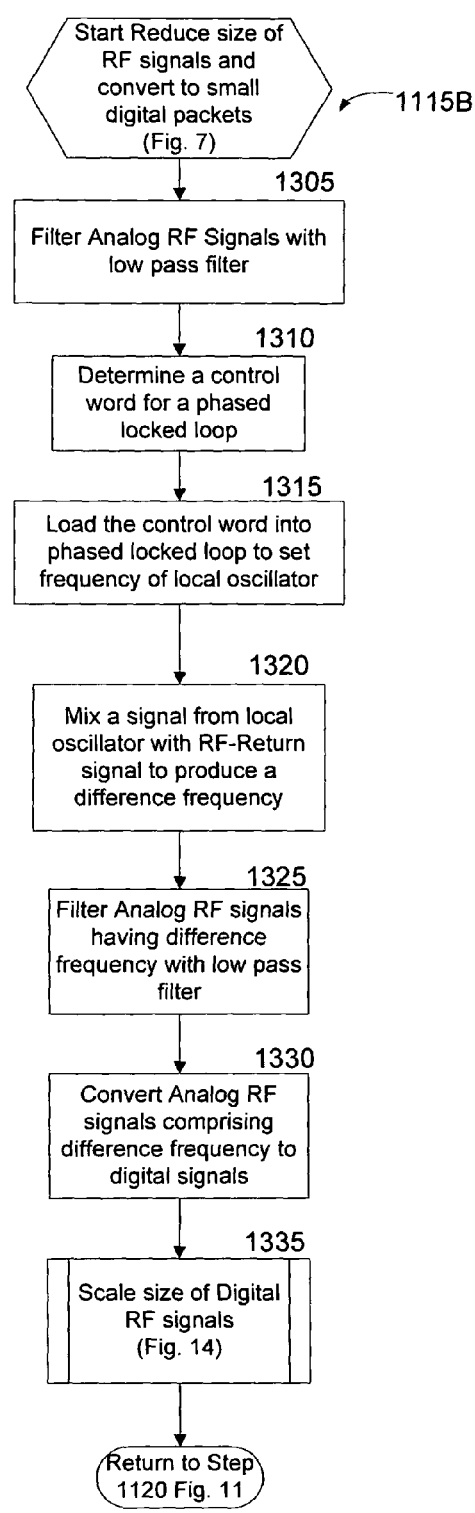
FIG. 13 is a logic flow diagram corresponding to the hardware of FIG. 7 and exemplary submethod of FIG. 11 for reducing the size of the upstream RF signals and converting the analog RF signals to digital data packets according to one exemplary embodiment of the present invention.

Referring now to FIG. 13, this Figure is a logic flow diagram corresponding to the hardware of FIG. 7 and exemplary submethod 1115B of FIG. 11 for reducing the size of the upstream RF signals and converting the analog RF signals to digital data packets according to one alternate and exemplary embodiment of the present invention. Step 1305 is the first step of the exemplary submethod 1115B in which in which analog RF signals from a video services terminal 117 are filtered with the low pass filter 519 of the diplexer 507 positioned in the subscriber optical interface 140B.

Next, in step 1310, a control word for a phased locked loop 523 is determined. In step 1315, the control word is loaded into the phased locked loop 523 to establish a frequency of the oscillator 526. In this embodiment, the local oscillator frequency can be determined by measuring the frequency of the incoming RF signal flowing out of a first low pass filter 519. The measured frequency can be calculated by measuring the time between a plurality of zero crossings of the RF signal. Once the measured frequency is determined, then an offset frequency can be added to the measured frequency such that the RF signal has side bands that extend near, but do not cross, a zero frequency value.

In step 1320, the analog signal from the local oscillator 526 is mixed with the analog RF return signal generated by the video services terminal 117 in the mixer 528 to produce a difference frequency. In step 1325, the difference frequency is filtered with a second low pass filter 519B and is fed into an A/D converter 509. Next, in step 1330, the difference frequency is converted to the digital domain with the A/D converter 509. In routine 1335, the digital RF signals are then scaled down with the data scaler 539 to reduce the amount of RF data transmitted. Further details of the data scaler 539 and routine 1335 will be discussed below with respect to FIG. 14. The process then returns to step 1120 of FIG. 11.

Exemplary Method for Scaling Data Received from a VST

Figure 14:
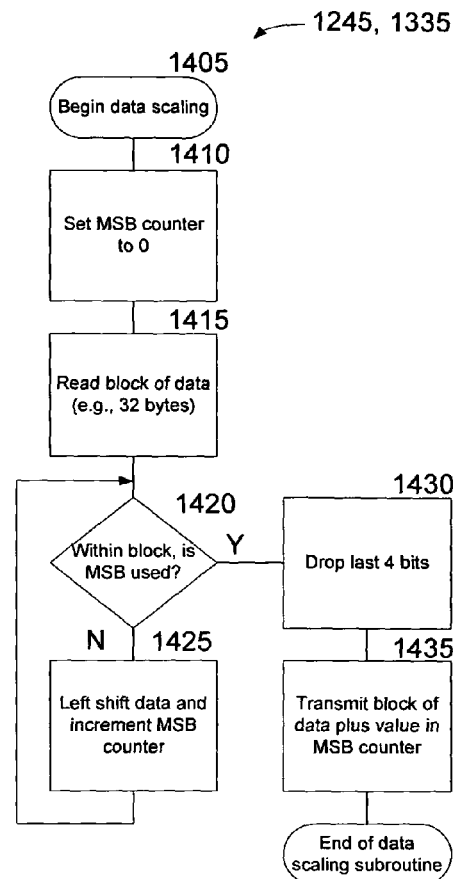
FIG. 14 is a logic flow diagram illustrating an exemplary submethod of FIGS. 12 and 13 for scaling data received from a video service terminal that can be performed by a data scaler as illustrated in FIGS. 8 and 9.

Referring now to FIG. 14, this Figure is a logic flow diagram illustrating an exemplary submethod 1245, 1335 of FIGS. 12 and 13 for scaling data received from a video service terminal 117 that can be performed by a data scaler 539 as illustrated in FIGS. 8 and 9. The data scaling unit 539 removes unnecessary numbers of bits from each sample, while maintaining the maximum scaling of the data. The technique is familiar to those skilled in the art, and for example has been used in the British NICAM (Near Instantaneous Compression and Modulation) method of transmitting digital audio information on an analog channel.

FIG. 14 illustrates one exemplary data scaling algorithm 1245, 1335 that can be performed by data scaling unit 539. The data scaling algorithm 1245, 1335 uses an example of reducing an 8 bit sample down to 4 bits, though other reductions can be used and are not beyond the scope of the present invention. The algorithm starts at step 1405. A counter, called a MSB (most significant bit) counter is used in the routine to keep track of the number of places on the left of a data word have been eliminated, as will be evident from the description below. The MSB counter is initially set to a count of 0 in step 1410.

In step 1415, a block of data, such as, but not limited to, thirty-two 8-bit bytes, are read and processed. Within that block of data, each sample is examined in step 1420 to determine if the MSB is a 1 or a 0. If all samples in the block have a 0 in the MSB position, then the inquiry to decision step 1420 is answered "No", meaning that the MSB is not used in any data in that set of bytes. If the inquiry to decision step 1420 is negative, then the "No" branch is followed to step 1425 in which the data may be shifted left.

At the same time, the MSB counter referred to above is incremented by 1, to keep track of how many times the block has been shifted. Operation then returns to decision step 1420, which again decides whether the MSB is used. If not, then the process repeats through step 1420, until the MSB is used. Note that this process applies to all the data words in the block of data being processed.

When the MSB is used, then the inquiry to decision step 1420 is positive and the "Yes" branch is followed to step 1430 in which the least significant four bits of the word are dropped. Thus, the routine 1345, 1435 has caused the retention of the four most significant bits that have data, in the block of data. These bits are transmitted in step 1435 along with the state of the MSB counter, which is used to reconstruct the waveform at the data service hub 110. The process then returns to either to step 1250 of FIG. 12 or step 1120 of FIG. 11 (because routine 1335 of FIG. 13 is the last step of that submethod).

Exemplary Method for Combining Reduced RF Packets with Regular Data Packets

Figure 15:
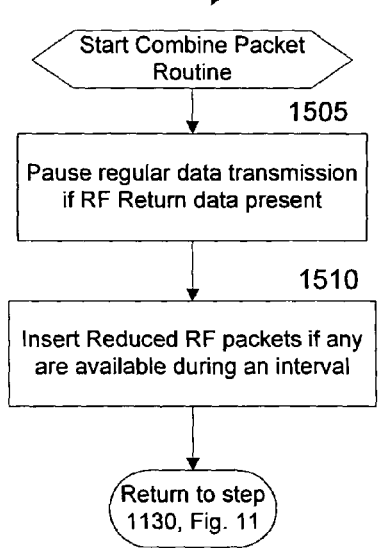
FIG. 15 is a logic flow diagram illustrating an exemplary subprocess of FIG. 11 for combining reduced RF packets with regular data packets.

Referring now to FIG. 15, this Figure is a logic flow diagram illustrating an exemplary subprocess 1125 of FIG. 11 for combining reduced RF packets with regular data packets. The combining reduced RF packets with regular data packets routine 1125, starts with step 1505. In step 1505, the regular data transmission of ordinary data packets appearing at data interface 555 of FIG. 6 or 7 is interrupted when the RF Return data is present. As noted above, while the upstream transmission of data packets can be interrupted at intervals with upstream RF packet transmission, it is noted that the intervals of interruption do not need to be regularly spaced from one another in time. According to one exemplary embodiment, one would not provide for a regular interval to help Will.

In step 1510, reduced RF packets are inserted between irregular data packets if the RF packets are available during an interval. Step 1510 corresponds to the simultaneous activation of switches 513 in each subscriber optical interface 140. According to one exemplary embodiment, there is nominally one SOI 140 per subscriber, and this switch 513 is located in that SOI. In some cases an SOI 140 may serve more than one subscriber, and then there will be only one switch 513 in the SOI 140. After step 1510, the subprocess ends and the process returns to step 1130 of FIG. 11.

Exemplary Method for Converting Reduced RF Data Packets into Regular Sized Data Packets Referring now to FIG. 16, this Figure is a logic flow diagram that corresponds to the hardware of FIG. 9 and illustrates a preferred exemplary subprocess 1165A of FIG. 11 for converting reduced RF data packets into regular sized data packets such as Ethernet packets according to one exemplary embodiment of the present invention. Routine 1605 is the first step of the subprocess 1165A in which the RF data packets received from the internet router 340 are restored with the scaling restoration unit 317. Further details for the scaling restoration unit 317 and the scaling restoration routine 1605 will be discussed below with respect to FIG. 18.

Next in step 1610, the two data streams that were transmitted are combined in Data Combiner 910, into the output data stream. This is a normal process for QPSK demodulation and is understood by those skilled in the art. It includes comparing the amplitude of each data sample in the two data streams and comparing with the previous data sample to determine what data was transmitted. The process is described in Section 4.2.6 of Ciciora et. al., *Modern Cable Television Technology: Video, Voice, and Data Transmission,* $2^{nd}$ ed., 2004, the entire contents of which are hereby incorporated by reference.

In step 1615, the recovered data is placed ("encapsulated") into packets, such as Ethernet packets, for further transmission, and the process returns to Step 1170 of FIG. 11.

Exemplary Method for Converting Reduced RF Data Packets into Regular Sized Packets Referring now to FIG. 17, this Figure is a logic flow diagram that corresponds to the hardware of FIG. 10A and that illustrates an alternate exemplary subprocess 1165B of FIG. 11 for converting reduced RF data packets into regular sized data packets such as Ethernet packets according to one exemplary embodiment of the present invention. Routine 1705 is the first step of the exemplary conversion subprocess 1165B in which the original and fuller digital RF signal is reconstructed with the scaling restoration unit 317. Further details of the scaling restoration unit 317 and scaling restoration routine 1705 will be discussed below with respect to FIG. 18.

The output of the Scaling Restoration Unit 317 is divided into first and second data streams in step 1710, which data streams are identical. In step 1715 the first data stream is mixed with a carrier signal. In step 1720 the second data stream is mixed with a carrier signal that is ninety degrees apart from the first carrier signal. The two outputs from the Mixers are combined in step 1725 to produce the resultant data stream. In step 1730, the data is encapsulated into packets such as Ethernet packets, as described above. The process then returns to step 1170 of FIG. 11.

Exemplary Scaling Restoration Process

Figure 18:
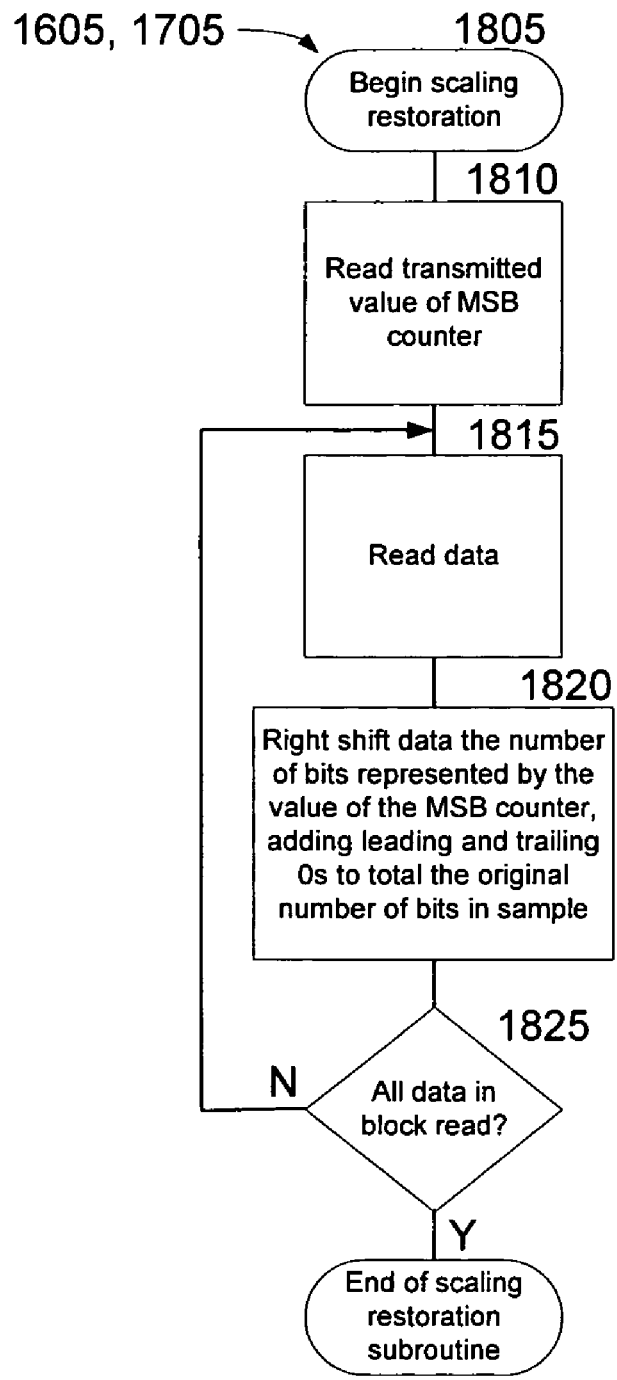
FIG. 18 illustrates an exemplary scaling restoration process according to one exemplary embodiment of the present invention.

Referring now to FIG. 18, this Figure illustrates an exemplary scaling restoration process 1605, 1705 according to one exemplary embodiment of the present invention. The restoration process starts at step 1805. The value of the MSB counter is read in step 1810, then data is read in step 1815. For each data word, the data is shifted right by the MSB counter value in step 1820, with leading zeros being added to the left of the transmitted bits. Of course, if fewer than the four most significant bits in the original word have been dropped, then some least significant bits are converted to zero by the process, but they represent only small errors in the recovered signal, and are tolerable.

In decision step 1825, it is determined whether all of the data the current transmission or block has been read. If the inquiry to decision step 1825 is negative, then the "No" branch is followed back to step 1815. If the inquiry to decision step 1825 is positive, then the "Yes" branch is followed to step 1830 where the data scaling restoration process ends and then returns to either step 1610 of FIG. 16 or step 1710 of FIG. 17.

Exemplary Process for Control Message Handling

Figure 19:
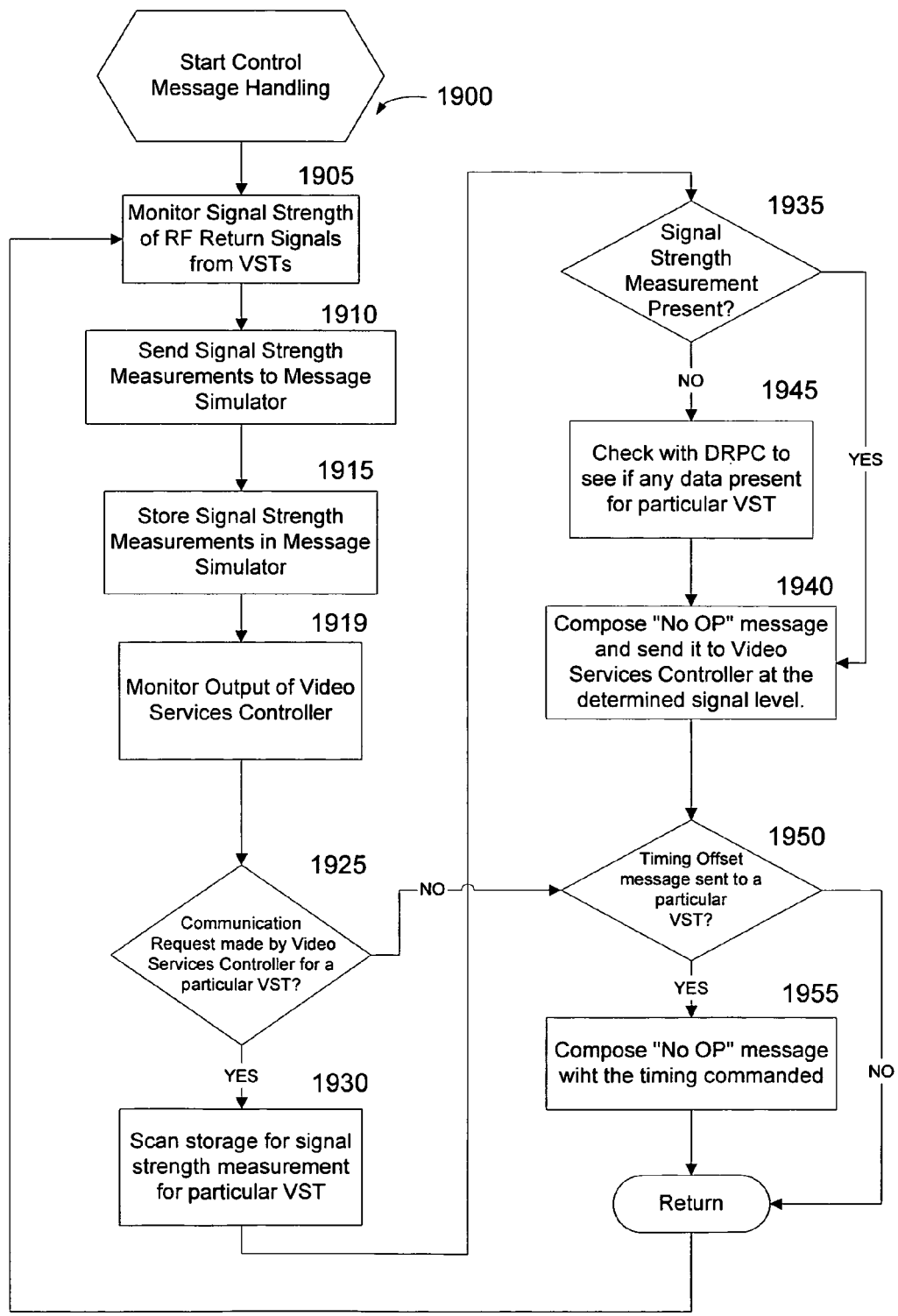
FIG. 19 is a logic flow diagram illustrating downstream control message handling according to an exemplary embodiment of the present invention.

FIG. 19 is a logic flow diagram illustrating downstream control message handling according to an exemplary embodiment of the present invention, where a message simulator is used in order to remove the need to modify software in the Video Service Controller 115 or the Video Service Terminal 117. Step 1905 is the first step of an exemplary method or process 1900 for handling control messages generated by the video services controller 115. In step 1905, the Digitized-RF-to-Packet Converter (DRPC) 307 can monitor signal strength for RF return signals generated by each VST 117. The DRPC 307 can comprise hardware or software or both for determining the strength of RF return signals originating from a particular VST 117. The DRPC 307 may also include a memory for storing the results of its signal strength or power level measurements of the RF return signals. The signal strength for each VST 117 may be tracked in this memory. At certain times or based upon a number of new signal strengths tracked, the DRPC 307 can forward its signal strength measurements to the message simulator 321 as set forth in step 1910.

In step 1915, the message simulator 321 can receive the signal strength measurements from the DRPC 307 and store them in its own memory. In step 1919, the output of the video services controller 115 can be monitored by the message simulator 321. In decision step 1925, the message simulator 1925 can determine if the video services controller 115 has sent a transmission generating a reply to a particular VST 117.

If the inquiry to decision step 1925 is positive, then the "Yes" branch can be followed to step 1930. If the inquiry to decision step 1925 is negative, then the "No" branch can be followed to decision step 1950.

In step 1930, the message simulator 321 can scan its memory for the particular VST 117. In decision step 1935, the message simulator 321 can determine if a signal strength entry is present for the particular VST 117 requested. If the inquiry to decision step 1935 is positive, then the "Yes" branch is followed to step 1940. If the inquiry to decision step 1935 is negative, then the "No" branch is followed to step 1945.

In step 1945, the message simulator 321 can request the DRPC 307 to see if it has any entry for the particular VST 117 being requested. If the DRPC 307 has a measurement for the particular VST 117, then it can forward this message back to the message simulator 321. If the DRPC 307 does not have an entry for the VST 117 being requested, then the DRPC can prioritize its scanning of incoming RF return signals for the particular VST 117 and forward this information on to the message simulator 321 once the DRPC 307 has a response.

In step 1940, the message simulator 321 can compose a "no operation" message based on the results its memory scan or the memory results it receives from the DRPC 307. The "no operation" message is sent to the RF receiver 309 at the reported level. The "no operation" message is used because the real message bound for the Video Service Controller 115 will be delivered directly from the DRPC 307, and not from the RF Receiver 309. The "no operation" message is used merely because the RF receiver 309 and RF transmitter 303 are expecting some sort of message. If the message simulator 321 does not have any results for a particular VST 117, the simulator 321 can wait until results are detected.

In decision step 1950, the message simulator 321 can determine if the video services controller 115 has sent a timing offset message or command for a particular VST 117. If the inquiry to decision step 1950 is negative, then the "No" branch is followed to the return step in which the process loops back to the first step 1905 of the method 1900.

If the inquiry to decision step 1950 is positive, then the "Yes" branch is followed to step 1955. In step 1955, the message simulator 321 can compose an artificial or "fake" response (another "no operation" message) that indicates to the video services controller 115 that the timing offset message or command has been received. The message simulator 321 can transmit this message at the offset time prescribed in the timing offset message. The process then returns to the first step 1905.

Alternate Embodiments

The present invention is not limited to the aforementioned laser transceiver nodes 120. The present invention may employ nodes 120 that operate with LEDs that produce wavelengths that may be unique to subscribers or groups of subscribers. In other words, each node 120 can further comprise one or more wavelength division multiplexers and demultiplexers. Each wavelength division multiplexer (WDM) can select one or more wavelengths of optical bandwidth originating from a respective optical tap multiplexer. Each WDM can then combine the one or more wavelengths of optical bandwidth together and feed them into a single optical waveguide 150. In this way, one optical waveguide 150 can service a number of individual optical taps 130 that can correspond to the number of optical tap multiplexers 440 present in the bandwidth transforming node 120. In such an exemplary embodiment, each optical tap 130 can divide data signals between a plurality of subscribers and can be capable of managing optical signals of multiple wavelengths.

The present invention is not limited to providing a return path for just legacy video service terminals 117. The return path of the present invention can be carry signals of other hardware devices that may not characterized as "legacy" hardware. The present invention may simply be used to provide increased bandwidth for additional conventional electronic communication devices that are supported by the optical network.

Conclusion

Thus, the present invention provides a unique method for inserting RF packets (derived from RF signals produced by a video service terminal) between upstream packets comprising data generated by a subscriber with a digital communication device such as a computer or internet telephone. Thus, the present invention provides an RF return path for legacy terminals that shares a return path for regular data packets in an optical network architecture.

It should be understood that the foregoing relates only to illustrate the embodiments of the present invention, and that numerous changes may be made therein without departing from the scope and spirit of the invention as defined by the following claims.

What is claimed is:

1. A return path of an optical network system comprising:
a video services controller for generating downstream analog RF modulated video service control signals that are converted to the optical domain, the video services controller being disposed at a first site; and
a device for converting digitized, upstream, RF return packets to standard sized digital packets, the RF return packets comprising data derived from digitized and compressed upstream analog RF modulated video service control signals, the video service control signals comprising one or more commands for managing video prorammin that is displayable on a display device, the device comprising a scaling restoration unit for restoring information from compressed data contained within the RF return packets, the device being coupled to the video services controller, the device decompressing, restoring, and demodulating the upstream analog RF modulated video service control signals from the data contained within the RF return packets, the device further comprising a packet encapsulator for formatting the demodulated video service control signals into standard sized digital packets that are processed by the video services controller for managing video programming.

2. The return path of claim 1, further comprising a switch for separating upstream digitized RF packets from upstream data packets.

3. The return path of claim 1, further comprising at least one subscriber optical interface for receiving RF-modulated signals, for converting the RF-modulated signals to first RF packets and combining the first packets with second packets for upstream transmission towards a data service hub comprising the video services controller.

4. The return path of claim 3, wherein the subscriber optical interface further reduces a size of the first packets.

5. The return path of claim 3, wherein the subscriber optical interface comprises a data reducer for adjusting a size of the first packets.

6. The return path of claim 3, wherein the subscriber optical interface splits the first digital data packets into first and second data streams.

7. The return path of claim 6, wherein the subscriber optical interface mixes the first data stream down to a zero frequency.

8. The return patch of claim 1, further comprising one or more optical waveguides connected to a data service hub comprising the video services controller, for carrying upstream optical signals and downstream optical signals.

9. The return path of claim 1, further comprising a laser transceiver node for communicating optical signals to a data service hub comprising the video services controller, and for apportioning bandwidth between subscribers of the optical network system.

10. The return path of claim 1, further comprising a data service hub for housing the video services controller, the data service hub receiving first packets comprising the digitized RF packets the second packets comprising data other than RF modulated signals.

11. The return path of claim 1, wherein video services controller support a time division multiple access (TDMA) protocol.

12. A method for providing a return path for signals in an optical network system comprising the steps of:
  receiving RF-modulated video service control signals, the video service control signals comprising one or more commands for managing video programming that is displayable on a display device;
  compressing the RF-modulated video service control signals;
  converting the compressed, RF-modulated video service control signals to a first digital information packet comprising RF modulated information;
  receiving a plurality of second digital information packets;
  transmitting the first and second digital information packets by inserting the first digital information packet between the second digital information packets;
  propagating the packets towards a data service hub;
  receiving the first and second digital information packets at the data service hub;
  converting the first digital information packets to third digital information packets by decompressing the RF-modulated video service control signals and restoring information from compressed data with a scaling restoration unit, and removing the RF modulation and by adding formatting information with a packet encapsulator, the third digital information packets comprising a standard packet format;
  receiving the third packets with a video services controller; and
  processing the third packets with the video services controller for managing video programming.

13. The method of claim 12, wherein the step of receiving the plurality of second digital information packets, further comprises receiving the plurality of second digital information packets from one of a computer and an internet telephone.

14. The method of claim 12, wherein converting the first digital information packets to third digital information packets comprises converting the first digital information packets to Ethernet formatted packets.

15. The method of claim 12, further comprising the step of splitting the first digital data packets into first and second data streams.

16. The method of claim 15, further comprising the step of mixing the first data stream down to a zero frequency.

17. The method of claim 15, further comprising the steps of:
  determining a control word for a phased locked loop;
  loading the control word into the phased locked to set a frequency of an oscillator.

18. A method for returning RF signals to a data service hub over an optical network comprising:
  receiving modulated RF video service control signals, the video service control signals comprising one or more commands for managing video programming that is displayable on a display device;
  compressing the modulated RF video service control signals;
  converting the compressed, modulated RF video service control signals into a plurality of first packets;
  receiving a plurality of second packets;
  combining the first packets with the second packets;
  propagating the combined packets towards the data service hub;
  changing a format of the first packets from a first format to a second format by decompressing the first packets and restoring information from compressed data with a scaling restoration unit, and demodulating the RF signals from the first packets and adding appropriate protocol information for the second format with a packet encapsulator;
  feeding the first packets to a video service controller; and
  processing the first packets with the video services controller for managing video programming.

19. The method of claim 18, wherein the second format comprises a format based upon an Ethernet format.

20. The method of claim 18, further comprising reducing the amount of data contained in the RF signals.

* * * * *